US012696105B2

(12) United States Patent
Ramachandra et al.

(10) Patent No.: US 12,696,105 B2
(45) Date of Patent: Jul. 28, 2026

(54) PREDICTIVE DECISION-MAKING IN A WIRELESS COMMUNICATION NETWORK

(71) Applicant: Telefonaktiebolaget LM Ericsson (publ), Stockholm (SE)

(72) Inventors: Pradeepa Ramachandra, Linköping (SE); Angelo Centonza, Torrenueva Costa (ES); Marco Belleschi, Solna (SE); Henrik Rydén, Stockholm (SE); Pablo Soldati, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 568 days.

(21) Appl. No.: 17/925,092

(22) PCT Filed: May 17, 2021

(86) PCT No.: PCT/SE2021/050463
§ 371 (c)(1),
(2) Date: Nov. 14, 2022

(87) PCT Pub. No.: WO2021/230805
PCT Pub. Date: Nov. 18, 2021

(65) Prior Publication Data
US 2023/0189022 A1     Jun. 15, 2023

Related U.S. Application Data

(60) Provisional application No. 63/025,203, filed on May 15, 2020.

(51) Int. Cl.
*H04W 24/02* (2009.01)
*H04W 36/00* (2009.01)
*H04W 76/15* (2018.01)

(52) U.S. Cl.
CPC ..... *H04W 24/02* (2013.01); *H04W 36/00692* (2023.05); *H04W 76/15* (2018.02); *H04W 36/00833* (2023.05)

(58) Field of Classification Search
CPC ................. H04W 24/02; H04W 76/15; H04W 36/00692; H04W 36/00833
See application file for complete search history.

(56) References Cited

U.S. PATENT DOCUMENTS

| | | | | |
|---|---|---|---|---|
| 10,856,191 | B1* | 12/2020 | Virtej | H04W 76/27 |
| 11,012,863 | B1* | 5/2021 | Marupaduga | H04W 16/14 |
| 2019/0261193 | A1* | 8/2019 | Torsner | H04W 24/10 |

FOREIGN PATENT DOCUMENTS

WO    2017162262 A1    9/2017

OTHER PUBLICATIONS

Morocho-Cayamcela, Manuel Eugenio, et al., "Machine Learning for 5G/B5G Mobile and Wireless Communications: Potential, Limitations, and Future Directions", Oct. 2, 2019, 1-23.

(Continued)

*Primary Examiner* — Ayaz R Sheikh
*Assistant Examiner* — Christopher R Davis
(74) *Attorney, Agent, or Firm* — Murphy, Bilak & Homiller, PLLC

(57) ABSTRACT

A network node (16) obtains, for each of one or more wireless devices, radio performance information (18) indicating measured radio performances that multiple cells respectively provided to the wireless device (20A) while the wireless device (20A) was simultaneously connected to the multiple cells in multi-connectivity operation under certain conditions. Based on the obtained radio performance information (18), the network node (16) builds a prediction model (24) which models radio performance that a cell will provide under one or more conditions. The network node (16) then makes or configures another network node to make (Continued)

OBTAINING, FOR EACH OF ONE OR MORE WIRELESS DEVICES, RADIO PERFORMANCE INFORMATION INDICATING MEASURED RADIO PERFORMANCES THAT MULTIPLE CELLS RESPECTIVELY PROVIDED TO THE WIRELESS DEVICE WHILE THE WIRELESS DEVICE WAS SIMULTANEOUSLY CONNECTED TO THE MULTIPLE CELLS IN MULTI-CONNECTIVITY OPERATION UNDER CERTAIN CONDITIONS
400

BASED ON THE OBTAINED RADIO PERFORMANCE INFORMATION, BUILDING A PREDICTION MODEL WHICH MODELS RADIO PERFORMANCE THAT A CELL WILL PROVIDE UNDER ONE OR MORE CONDITIONS
410

MAKING, OR CONFIGURING ANOTHER NETWORK NODE TO MAKE, DECISIONS ON MOBILITY, SCHEDULING, AND/OR RADIO CONFIGURATION OF WIRELESS DEVICES BASED ON THE PREDICTION MODEL
420

STEERING WIRELESS DEVICES TOWARDS A CELL FOR WHICH THE PREDICTION MODEL HAS A PREDICTION ACCURACY BELOW A THRESHOLD
430 decisions on mobility, scheduling and/or radio configuration of wireless devices based on the prediction model (24).

25 Claims, 15 Drawing Sheets

(56)             References Cited

OTHER PUBLICATIONS

Moysen, Jessica, et al., "From 4G to 5G: Self-organized Network Management meets Machine Learning", arXiv:1707.09300v1 [cs. NI], XP80780286A, 2017, 1-25.
Tesema, Fasil Berhanu, et al., "Evaluation of Context-Aware Mobility Robustness Optimization and Multi-Connectivity in Intra-Frequency 5G Ultra Dense Networks", IEEE Wireless Communications Letters, vol. 5, No. 6, Dec. 2016, 608-611.
Wang, Chujie, et al., "Deep Learning-based Intelligent Dual Connectivity for Mobile Management in Dense Network", IEEE 88th Vehicular Technology Conference (VTC-Fall), XP033535178, 2018, 1-5.

* cited by examiner

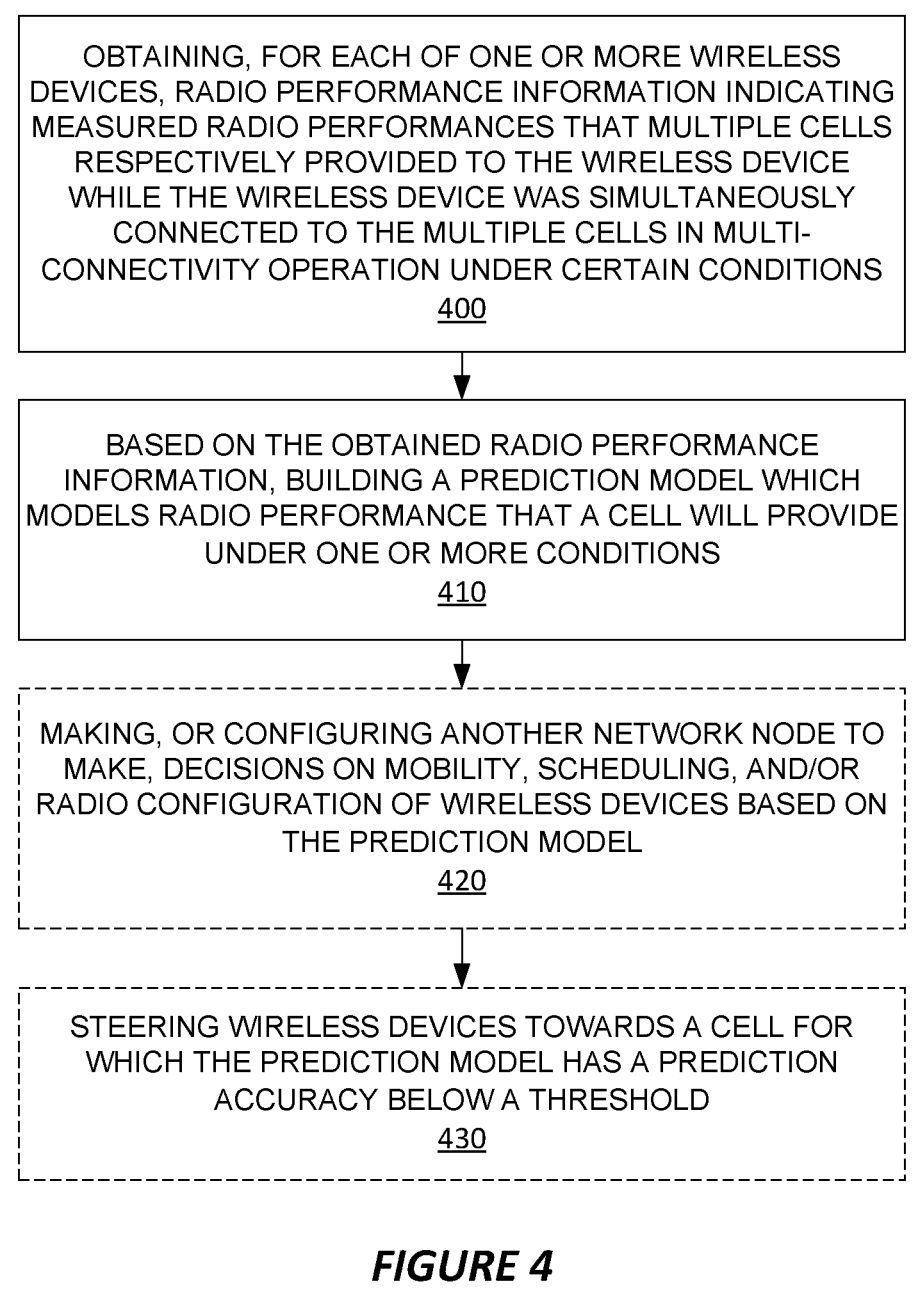

OBTAINING, FOR EACH OF ONE OR MORE WIRELESS DEVICES, RADIO PERFORMANCE INFORMATION INDICATING MEASURED RADIO PERFORMANCES THAT MULTIPLE CELLS RESPECTIVELY PROVIDED TO THE WIRELESS DEVICE WHILE THE WIRELESS DEVICE WAS SIMULTANEOUSLY CONNECTED TO THE MULTIPLE CELLS IN MULTI-CONNECTIVITY OPERATION UNDER CERTAIN CONDITIONS
400

BASED ON THE OBTAINED RADIO PERFORMANCE INFORMATION, BUILDING A PREDICTION MODEL WHICH MODELS RADIO PERFORMANCE THAT A CELL WILL PROVIDE UNDER ONE OR MORE CONDITIONS
410

MAKING, OR CONFIGURING ANOTHER NETWORK NODE TO MAKE, DECISIONS ON MOBILITY, SCHEDULING, AND/OR RADIO CONFIGURATION OF WIRELESS DEVICES BASED ON THE PREDICTION MODEL
420

STEERING WIRELESS DEVICES TOWARDS A CELL FOR WHICH THE PREDICTION MODEL HAS A PREDICTION ACCURACY BELOW A THRESHOLD
430

*FIGURE 4*

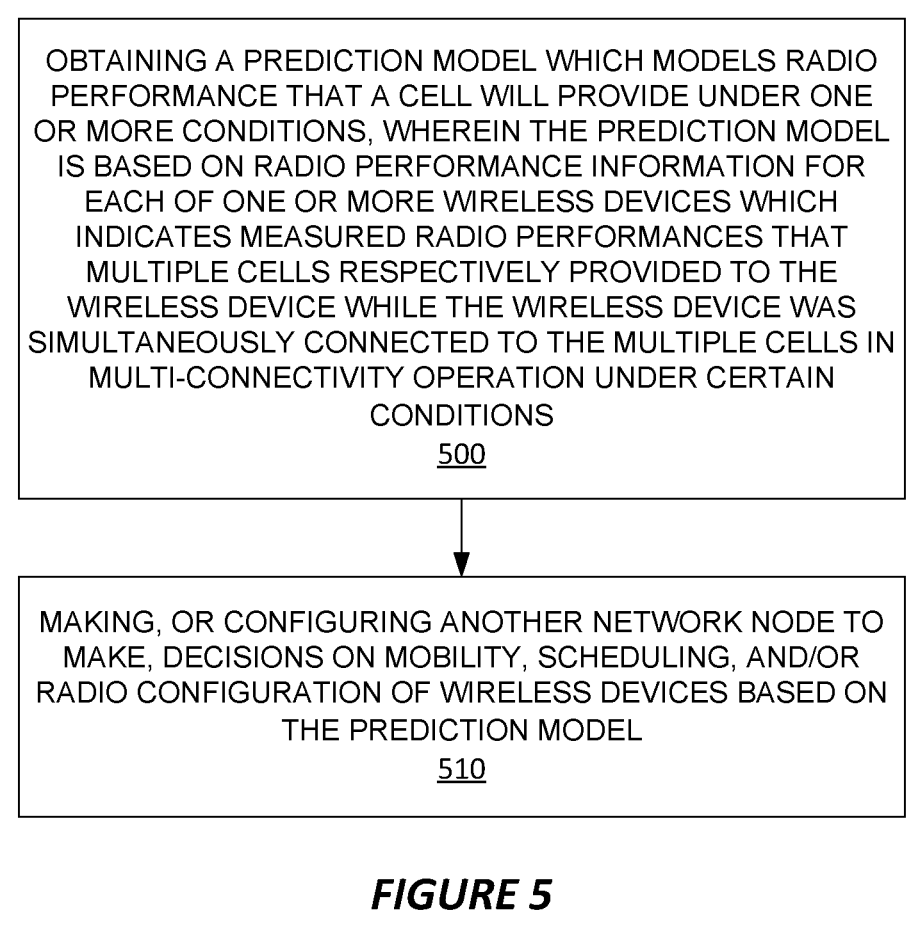

OBTAINING A PREDICTION MODEL WHICH MODELS RADIO
PERFORMANCE THAT A CELL WILL PROVIDE UNDER ONE
OR MORE CONDITIONS, WHEREIN THE PREDICTION MODEL
IS BASED ON RADIO PERFORMANCE INFORMATION FOR
EACH OF ONE OR MORE WIRELESS DEVICES WHICH
INDICATES MEASURED RADIO PERFORMANCES THAT
MULTIPLE CELLS RESPECTIVELY PROVIDED TO THE
WIRELESS DEVICE WHILE THE WIRELESS DEVICE WAS
SIMULTANEOUSLY CONNECTED TO THE MULTIPLE CELLS IN
MULTI-CONNECTIVITY OPERATION UNDER CERTAIN
CONDITIONS
500

MAKING, OR CONFIGURING ANOTHER NETWORK NODE TO
MAKE, DECISIONS ON MOBILITY, SCHEDULING, AND/OR
RADIO CONFIGURATION OF WIRELESS DEVICES BASED ON
THE PREDICTION MODEL
510

FIGURE 5

PREDICTIVE DECISION-MAKING IN A WIRELESS COMMUNICATION NETWORK

TECHNICAL FIELD

The present application relates generally to a wireless communication network, and relates more particularly to predictive decision-making in such a network.

BACKGROUND

Handover in a wireless communication network is a process for transferring a wireless device with an ongoing call or data session from a source cell to a target cell. The network must decide which wireless device, if any, should perform a handover, to which target cell that handover should be performed, when the handover should be performed, and the like. These decisions have traditionally been made based on cell signal strength or quality, cell load level, or other such information that characterizes which cell is most suitable for a wireless device.

Machine learning can enhance traditional handover approaches. For example, machine learning can be employed to predict which cell will be the most suitable for a wireless device, so that handover decisions can then be made based on that prediction. Performing handover in this way may advantageously improve handover success rates, increase device throughput, balance cell load, and the like. Realization of these and other advantages, however, requires good prediction accuracy. And good prediction accuracy in turn requires substantial training of the machine learning model. This training process takes time and burdens many wireless devices.

SUMMARY

Some embodiments herein exploit multi-connectivity operation for building a prediction model on which decisions in a wireless communication network can be made, e.g., decisions on mobility, scheduling, and/or radio configuration of wireless devices. By exploiting multi-connectivity operation, some embodiments build the prediction model based on measured radio performance that multiple cells respectively provided to a wireless device while the wireless device was simultaneously connected to those cells. This means the prediction model is built based on radio performances that the cells actually provided to a wireless device under the same conditions (e.g., at the same time and/or location), rather than such radio performances being tenuously extrapolated from performance measurements taken for the cells under different conditions (e.g., at different times and/or locations). Some embodiments thereby improve prediction accuracy. Moreover, exploiting multi-connectivity operation in this way may advantageously reduce the burden imposed on wireless devices for training of the prediction model, e.g., by reducing the number of measurements, the number of wireless devices, and/or the types of wireless devises needed for training.

More particularly, embodiments herein include a method performed by a network node. The method may comprise obtaining, for each of one or more wireless devices, radio performance information indicating measured radio performances that multiple cells respectively provided to the wireless device while the wireless device was simultaneously connected to the multiple cells in multi-connectivity operation under certain conditions. The method may further comprise, based on the obtained radio performance information, building a prediction model which models radio performance that a cell will provide under one or more conditions. The method may also comprise making, or configuring another network node to make, decisions on mobility, scheduling, and/or radio configuration of wireless devices based on the prediction model.

In some embodiments, the radio performance information obtained for a wireless device indicates measured radio performances that multiple cells respectively provided to the wireless device while the wireless device was simultaneously connected to the multiple cells in multi-connectivity operation during certain times. Additionally or alternatively, the radio performance information obtained for a wireless device indicates measured radio performances that multiple cells respectively provided to the wireless device while the wireless device was simultaneously connected to the multiple cells in multi-connectivity operation at certain locations. In this case, the prediction model models radio performance that a cell will provide to a wireless device during one or more times and/or at one or more locations.

In some embodiments, the radio performance information obtained for a wireless device indicates measured radio performances that multiple cells respectively provided to the wireless device while the wireless device was simultaneously connected to the multiple cells in multi-connectivity operation using a certain radio configuration. In this case, the prediction model models radio performance that a cell will provide to a wireless device under one or more radio configurations. In one or more of these embodiments, the certain radio configuration is a multi-connectivity configuration, and the one or more radio configurations are one or more multi-connectivity configurations.

In some embodiments, the radio performance information obtained for a wireless device indicates measured radio performances that multiple cells respectively provided to the wireless device while the wireless device was simultaneously connected to the multiple cells in multi-connectivity operation with certain device capabilities. In this case, the prediction model models radio performance that a cell will provide to a wireless device with one or more device capabilities.

In some embodiments, the method comprises making, or configuring another network node to make, decisions on mobility of wireless devices based on the prediction model. In this case, mobility comprises inter-frequency mobility or inter radio access technology mobility.

In some embodiments, the method comprises making, or configuring another network node to make, decisions on mobility of wireless devices based on the prediction model. In this case, decisions on mobility include at least one of any one or more of a decision on which cell is to be a target of a mobility procedure for a wireless device, a decision on which wireless device is to perform a mobility procedure, and a decision on where or when a wireless device is to perform a mobility procedure.

In some embodiments, the method comprises making, or configuring another network node to make, decisions on scheduling of wireless devices based on the prediction model. In this case, making, or configuring another network node to make, decisions on scheduling of wireless devices based on the prediction model comprises making, or configuring another network node to make, a decision that a wireless device is to be prioritized for scheduling before the wireless device arrives at a location where, according to the prediction model, one or more cells will provide radio performance below a threshold.

In some embodiments, the method comprises making, or configuring another network node to make, decisions on radio configuration of wireless devices based on the prediction model. In this case, said decision on radio configuration comprise at least one of any one or more of a decision on whether or how to configure multi-connectivity operation of a wireless device, a decision on whether or how to configure carrier aggregation for a wireless device, a decision on whether or how to configure power boosting for a wireless device, and a decision on whether or how to configure transmission time interval, TTI, bundling for a wireless device.

In some embodiments, obtaining radio performance information comprises inferring or deducing at least some of the radio performance information. In this case, inferring or deducing at least some of the radio performance information comprises inferring or deducing radio performance information that indicates radio performance of a cell, based on a type or content of one or more messages received or intercepted from a radio network node providing the cell, a change in an extent to which the cell transmits or receives user plane traffic to a wireless device, whether the cell has transmitted or received user plane traffic to a wireless device within a certain time interval, and/or a change in an allocation of resources for transmitting or receiving user plane traffic to a wireless device in the cell.

In some embodiments, the network node is a radio network node configured as a master radio network node for multi-connectivity operation of a wireless device, a secondary radio network node for multi-connectivity operation of a wireless device, or an operation and maintenance node.

In some embodiments, configuring another network node to make decisions on mobility, scheduling, and/or radio configuration of wireless devices based on the prediction model comprises transmitting the prediction model to the other network node.

In some embodiments, the prediction model is a machine learning model built using machine learning.

In some embodiments, radio performance information that indicates measured radio performance that a cell provides to a wireless device comprises at least one of any one or more of measured reference signal strength or quality of the cell, measured reference signal strength or quality of a neighbor cell of the cell, measured radio link control throughput of the cell, measured spectral efficiency of the cell, measured packet error rate of the cell, measured packet delay of the cell, measured packet loss rate of the cell, measured channel quality information of the cell, and measured block error rate of the cell.

Other embodiments herein include a method performed by a network node. The method comprises obtaining a prediction model which models radio performance that a cell will provide under one or more conditions. In this case, the prediction model is based on radio performance information for each of one or more wireless devices which indicates measured radio performances that multiple cells respectively provided to the wireless device while the wireless device was simultaneously connected to the multiple cells in multi-connectivity operation under certain conditions. The method further comprises making, or configuring another network node to make, decisions on mobility, scheduling, and/or radio configuration of wireless devices based on the prediction model.

In some embodiments, the prediction model models radio performance that a cell will provide to a wireless device during one or more times. Additionally or alternatively, the prediction model models radio performance that a cell will provide to a wireless device at one or more locations. Additionally or alternatively, the prediction model models radio performance that a cell will provide to a wireless device under one or more cell load levels. Additionally or alternatively, the prediction model models radio performance that a cell will provide to a wireless device under one or more radio configurations. Additionally or alternatively, the prediction model models radio performance that a cell will provide to a wireless device with one or more device capabilities. In one or more of these embodiments, the prediction model models radio performance that a cell will provide to a wireless device under one or more radio configurations. In this case, the one or more radio configurations are one or more multi-connectivity configurations.

In some embodiments, the method comprises making, or configuring another network node to make, decisions on mobility of wireless devices based on the prediction model. In some embodiments, mobility comprises inter-frequency mobility or inter radio access technology mobility.

In some embodiments, the method comprises making, or configuring another network node to make, decisions on mobility of wireless devices based on the prediction model. In some embodiments, decisions on mobility include at least one of any one or more of a decision on which cell is to be a target of a mobility procedure for a wireless device, a decision on which wireless device is to perform a mobility procedure, and a decision on where or when a wireless device is to perform a mobility procedure.

In some embodiments, the method comprises making, or configuring another network node to make, decisions on scheduling of wireless devices based on the prediction model. In this case, making, or configuring another network node to make, decisions on scheduling of wireless devices based on the prediction model may comprise making, or configuring another network node to make, a decision that a wireless device is to be prioritized for scheduling before the wireless device arrives at a location where, according to the prediction model, one or more cells will provide radio performance below a threshold.

In some embodiments, the method comprises making, or configuring another network node to make, decisions on radio configuration of wireless devices based on the prediction model. In some embodiments, the decision on radio configuration comprises at least one of any one or more of a decision on whether or how to configure multi-connectivity operation of a wireless device, a decision on whether or how to configure carrier aggregation for a wireless device, a decision on whether or how to configure power boosting for a wireless device, and a decision on whether or how to configure transmission time interval, TTI, bundling for a wireless device.

In some embodiments, the network node is a radio network node configured as a master radio network node for multi-connectivity operation of a wireless device, a secondary radio network node for multi-connectivity operation of a wireless device, or an operation and maintenance node.

In some embodiments, the prediction model is a machine learning model built using machine learning.

In some embodiments, radio performance information that indicates measured radio performance that a cell provides to a wireless device comprises at least one of any one or more of measured reference signal strength or quality of the cell, measured reference signal strength or quality of a neighbor cell of the cell, measured radio link control throughput of the cell, measured spectral efficiency of the cell, measured packet error rate of the cell, measured packet delay of the cell, measured packet loss rate of the cell, measured channel quality information of the cell, and measured block error rate of the cell.

Other embodiments herein include a network node configured to obtain, for each of one or more wireless devices, radio performance information indicating measured radio performances that multiple cells respectively provided to the wireless device while the wireless device was simultaneously connected to the multiple cells in multi-connectivity operation under certain conditions. The network node is also configured to, based on the obtained radio performance information, build a prediction model which models radio performance that a cell will provide under one or more conditions. The network node is also configured to make, or configure another network node to make, decisions on mobility, scheduling, and/or radio configuration of wireless devices based on the prediction model.

In some embodiments, the network node is configured to perform the steps described above for a network node.

Other embodiments herein include a network node configured to obtain a prediction model which models radio performance that a cell will provide under one or more conditions. In some embodiments, the prediction model is based on radio performance information for each of one or more wireless devices which indicates measured radio performances that multiple cells respectively provided to the wireless device while the wireless device was simultaneously connected to the multiple cells in multi-connectivity operation under certain conditions. The network node is also configured to make, or configure another network node to make, decisions on mobility, scheduling, and/or radio configuration of wireless devices based on the prediction model.

In some embodiments, the network node is configured to perform the steps described above for a network node.

Other embodiments herein include a computer program comprising instructions which, when executed by at least one processor of a network node, causes the network node to perform the steps described above for a network node.

In some embodiments, the carrier is one of an electronic signal, optical signal, radio signal, or computer readable storage medium.

Other embodiments herein include a network node comprising communication circuitry and processing circuitry. The processing circuitry is configured to obtain, for each of one or more wireless devices, radio performance information indicating measured radio performances that multiple cells respectively provided to the wireless device while the wireless device was simultaneously connected to the multiple cells in multi-connectivity operation under certain conditions. The processing circuitry is also configured to based on the obtained radio performance information, build a prediction model which models radio performance that a cell will provide under one or more conditions. The processing circuitry is also configured to make, or configure another network node to make, decisions on mobility, scheduling, and/or radio configuration of wireless devices based on the prediction model.

In some embodiments, the processing circuitry is configured to perform the steps described above for a network node.

Other embodiments herein include a network node comprising communication circuitry and processing circuitry. The processing circuitry is configured to obtain a prediction model which models radio performance that a cell will provide under one or more conditions. In some embodiments, the prediction model is based on radio performance information for each of one or more wireless devices which indicates measured radio performances that multiple cells respectively provided to the wireless device while the wireless device was simultaneously connected to the multiple cells in multi-connectivity operation under certain conditions. The processing circuitry is also configured to make, or configure another network node to make, decisions on mobility, scheduling, and/or radio configuration of wireless devices based on the prediction model.

In some embodiments, the processing circuitry is configured to perform the steps described above for a network node.

Embodiments herein also include corresponding apparatus, computer programs, and carriers of those computer programs.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 4 is a logic flow diagram of a method performed by a network node according to some embodiments.

FIG. 5 is a logic flow diagram of a method performed by a network node according to other embodiments.

DETAILED DESCRIPTION

Figure 1:
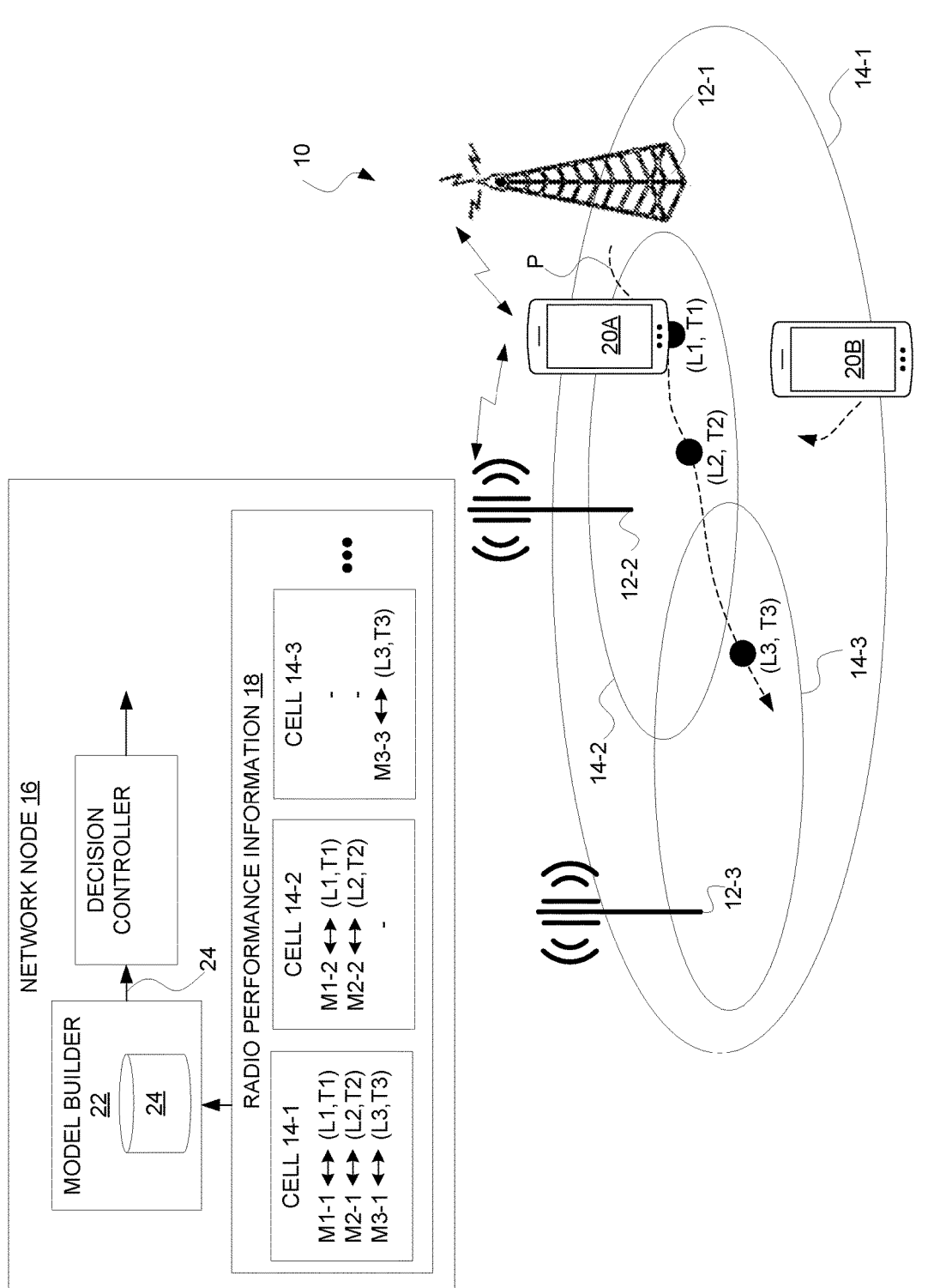
FIG. 1 is a block diagram of a wireless communication network according to some embodiments.

FIG. 1 shows a wireless communication network 10 according to some embodiments. The network 10 comprises multiple radio network nodes, including radio network nodes 12-1, 12-2, and 12-3 shown in FIG. 1, e.g., in the form of base stations. The radio network nodes may be included in a radio access network (RAN) portion of the network 10, which may in turn connect to a core network (CN) portion (not shown).

Each radio network node serves one or more cells. As shown for simplicity, radio network node 12-1 serves cell 14-1, radio network node 12-2 serves cell 14-2, and radio network node 12-3 serves cell 14-3. In this example, the radio coverage of cell 14-1 at least partially overlaps with the radio coverage of cell 14-2 and the radio coverage of cell 14-3, and the radio coverage of cells 14-2 and 14-3 at least partially overlap with one another. Different cells may be provided on different carrier frequencies, with different frequency bandwidths, and/or using different radio access technologies.

In some embodiments, one or more of the radio network nodes are configured to support multi-connectivity operation of a wireless device, e.g., a user equipment (UE). Multi-connectivity in this regard refers to the simultaneous connection of a wireless device (e.g., at a radio resource control, RRC, layer) to multiple different radio network nodes, or to multiple different cells served by different radio network nodes. The multiple different radio network nodes or cells may use the same radio access technology (e.g., both may use Evolved Universal Terrestrial Radio Access (E-UTRA) or both may use New Radio (NR)). Or, the multiple different radio network nodes or cells may use different radio access technologies, e.g., one may use E-UTRA and another may use NR.

One example of multi-connectivity is dual connectivity (DC) in which a wireless device is simultaneously connected to two different radio network nodes, or to two different cells served by two different radio network nodes. In this case, the wireless device may be configured with a so-called master cell group (MCG) and a secondary cell group (SCG), where the MCG includes one or more cells served by the radio network node acting as a master node and the SCG includes one or more cells served by the radio network node acting as a secondary node. The master node may be a master in the sense that it controls the secondary node. For example, E-UTRA-NR (EN) DC refers to where the master node uses E-UTRA and the secondary node uses NR, whereas NR-E-UTRA (NE) refers to where the master node uses NR and the secondary node uses E-UTRA.

Figure 2:
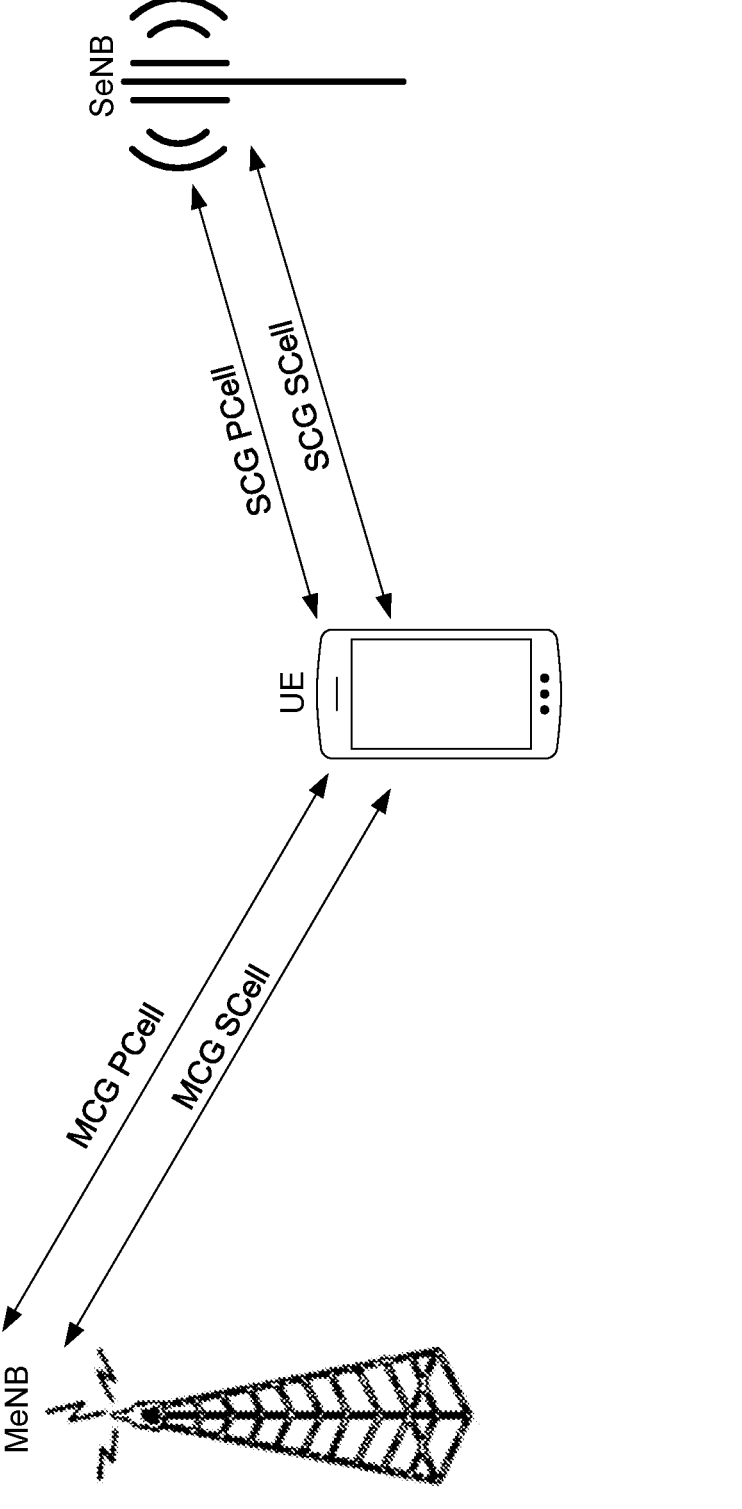
FIG. 2 is a block diagram of dual connectivity according to some embodiments.

FIG. 2 shows one such example of dual connectivity. As shown, dual connectivity enables the establishment of user plane connections via another radio node, referred to as a Secondary eNB (SeNB), while maintaining the higher layer connection management (RRC) via a Master eNB (MeNB). This means that a device may have user plane connections completely via the MeNB, completely via the SeNB, or split between both MeNB and SeNB.

In some embodiments, a wireless device operates in multi-connectivity with multiple receivers (Rx) and/or transmitters (Tx) and utilizes radio resources amongst one or more radio access technologies (e.g., New Radio, NR, and/or E-UTRA) provided by multiple distinct schedulers connected via a non-ideal backhaul. Multi-radio dual connectivity (MR-DC) in this regard is a generalization of Intra-E-UTRA DC, where a multiple Rx/Tx wireless device may be configured to utilize resources provided by two different nodes connected via a non-ideal backhaul, one providing NR access and the other one providing either E-UTRA or NR access. One node acts as the master node (MN) and the other as the SN. E-UTRAN for instance supports MR-DC via E-UTRA-NR dual connectivity (EN-DC), in which a wireless device is connected to one eNB that acts as a MN and one en-gNB that acts as a secondary node (SN). Either way, in MR-DC, the wireless device may have a single Radio Resource Control (RRC) state, based on the MN RRC and a single control plane connection towards the core network.

Some embodiments herein exploit multi-connectivity operation for building a prediction model on which decisions in the wireless communication network 10 can be made, e.g., decisions on mobility, scheduling, and/or radio configuration of wireless devices. FIG. 1 shows a network node 16 configured to build and/or use such a prediction model. The network node 16 may be a radio network node (e.g., radio network node 12-1, 12-2, or 12-3), a core network node, an operations and maintenance network node, or any other node in the wireless communication network 10.

Regardless, the network node 16 as shown is configured to obtain radio performance information 18 for each of one or more wireless devices. The radio performance information 18 for a given wireless device indicates measured radio performances that multiple cells (e.g., PCell and PSCell in dual connectivity) respectively provided to the wireless device while the wireless device was simultaneously connected to the multiple cells in multi-connectivity operation under certain conditions, e.g., at a certain time, at a certain location, under a certain cell load, using a certain device capability, using a certain radio configuration such as a certain multi-connectivity configuration, etc. In some embodiments, for example, the respective radio performance that each of the multiple cells provides to the wireless device is measured while the wireless device is simultaneously connected to the multiple cells. This way, the radio performance measurements for the different cells will be made under the same conditions. The radio performance may be measured, for instance, in terms of reference signal strength or quality, reference signal strength or quality of a neighbor cell, radio link control throughput, spectral efficiency, packet error rate, packet delay, packet loss rate, channel quality information, block error rate, or any combination thereof. No matter the particular measure of radio performance, though, the radio performance measurement(s) of a cell may be mapped or otherwise associated with conditions under which the measurement(s) were made. Having exploited multi-connectivity operation, then, the radio performance information 18 for a wireless device indicates the measured radio performances respectively provided by multiple cells under the same conditions, e.g., at the same time and/or at the same location.

In the example of FIG. 1, for instance, the radio performance information 18 obtained for a wireless device 20A may indicate measured radio performances that multiple cells respectively provided to the wireless device 20A while the wireless device 20A was simultaneously connected to the cells in multi-connectivity operation at certain times and locations, e.g., as the wireless device 20A moved along a path P. As shown in this regard, the radio performance information 18 for the wireless device 20A indicates that, while the wireless device 20A was simultaneously connected to cells 14-1 and 14-2 at time T1 and location L1, cell 14-1 provided the wireless device 20A with measured radio performance M1-1 and cell 14-2 provided the wireless device 20A with measured radio performance M1-2. The radio performance information 18 for the wireless device 20A also indicates that, while the wireless device 20A was simultaneously connected to cells 14-1 and 14-2 at a different time T2 and a different location L2, cell 14-1 provided the wireless device 20A with measured radio performance M2-1 and cell 14-2 provided the wireless device 20A with measured radio performance M2-2. At time T3 and location L3, though, the wireless device 20A switched from being simultaneously connected to cells 12-1 and 12-2 to being simultaneously connected to cells 12-1 and 12-3. Accordingly, the radio performance information 18 for the wireless device 20A indicates that, while the wireless device 20A was simultaneously connected to cells 14-1 and 14-3 at time T3 and location L3, cell 14-1 provided the wireless device 20A with measured radio performance M3-1 and cell 14-3 provided the wireless device 20A with measured radio performance M3-3. Notably, then, the radio performance information 18 for the wireless device 20A indicates the measured radio performances respectively provided by cells 14-1, 14-2 under the same conditions (e.g., at the same time T1 and location L1), and also indicates the measured radio performances respectively provided by cells 14-1, 14-3 under the same conditions (e.g., at the same time T3 and location L3).

Note from this example, then, that the network node 16 may obtain radio performance information 18 for the same wireless device under different conditions (e.g., at different times and device locations), so that the radio performance information 18 reflects radio performances respectively provided by multiple cells across those different conditions. And the multiple cells whose radio performance is reflected by the radio performance information 18 for certain conditions may vary depending on the conditions. For example, the radio performance information 18 reflects radio performances for cells 14-1 and 14-2 for some times (T1, T2) and locations (L1, L3), but reflects radio performances for cells 14-1 and 14-3 for other times (T3) and locations (L3). Generally, then, the radio performance information 18 may indicate, for each of multiple different sets of cells, radio performances respectively provided to a wireless device by the cells in that set while the wireless device was simultaneously connected to those cells in multi-connectivity operation under certain conditions. For instance, the radio performance information 18 may indicate, for a first set of cells that includes cells 14-1 and 14-2, radio performances respectively provided to the wireless device 20A by the cells 14-1, 14-2 in that set while the wireless device 20A was simultaneously connected to those cells 14-1, 14-2 in multi-connectivity operation under certain conditions. And the radio performance information 18 may also indicate, for a second set of cells that includes cells 14-1 and 14-3, radio performances respectively provided to the wireless device 20A by the cells 14-1, 14-3 in that set while the wireless device 20A was simultaneously connected to those cells 14-1, 14-3 in multi-connectivity operation under other conditions.

Note further that the network node 16 may obtain radio performance information 18 for any number of wireless devices in a similar way as exemplified for wireless device 20A. The radio performance information 18 may thereby broadly indicate radio performances provided by multiple cells under different conditions, with the radio performances indicated for at least some cells having been measured under the same conditions (e.g., at the same time and location) due to those cells' performances having been measured while at least one wireless device was simultaneously connected to the cells in multi-connectivity operation.

Note also that the network node 16 may obtain the radio performance information 18 in any number of ways. In some embodiments, for example, the network node 16 receives at least some of the radio performance information 18 from another network node, referred to for convenience as an information providing network node. The network node 16 may for instance request at least some of the radio performance information 18 from the information providing network node, and correspondingly receive at least some of the radio performance information 18 from the information providing network node in response to that request.

In one embodiment where the network node 16 is a radio network node (e.g., radio network node 12-1) that serves one of the cells whose radio performance is indicated by the radio performance information 18, the network node 16 may receive at least some of the radio performance information 18 from one or more other radio network nodes (e.g., radio network nodes 12-2 and/or 12-3) that serve one or more others of the cells whose radio performance is indicated by the radio performance information 18. In dual connectivity embodiments, for instance, the network node 16 may be a master node serving cell(s) in a master cell group (MCG) for multi-connectivity operation of a certain wireless device and may receive at least some of the radio performance information 18 from another radio network node that is a secondary node serving cell(s) in a secondary cell group (SCG) for multi-connectivity operation of that wireless device. Or, in other dual connectivity embodiments, the network node 16 may be a secondary node serving cell(s) in an SCG for multi-connectivity operation of a certain wireless device and may receive at least some of the radio performance information 18 from another radio network node that is a master node serving cell(s) in an MSG for multi-connectivity operation of that wireless device. In these and other embodiments, then, the network node 16 may receive at least some of the radio performance information 18 from another network node (e.g., related to a cell served by that other network node) and may generate (or receive from a wireless device) other radio performance information 18 (e.g., that related to a cell served by the network node 16).

Alternatively or additionally, the network node 16 may obtain at least some of the radio performance information 18 by inferring or deducing it. The network node 16 may for instance infer or deduce radio performance information that indicates radio performance of a cell, based on (i) a type or content of one or more messages received or intercepted from a radio network node providing the cell, such as a Downlink Data Delivery Status message or a data flush message; (ii) a change in an extent to which the cell transmits or receives user plane traffic to a wireless device; (iii) whether the cell has transmitted or received user plane traffic to a wireless device within a certain time interval; and/or (iv) a change in an allocation of resources for transmitting or receiving user plane traffic to a wireless device in the cell.

In yet other embodiments, such as where the network node 16 is an operations and maintenance node, the network node 16 may obtain the radio performance information 18 by receiving all of the radio performance information 18 from one or more other network nodes.

In any event, no matter how the radio performance information 18 is obtained, the network node 16 as shown includes a model builder 22 configured to build a prediction model 24 based on the radio performance information 18. The prediction model 24 models radio performance that a cell will provide under one or more conditions, e.g., so as to be a model usable for predicting radio performance that the cell will provide under certain conditions. The prediction model 24 may for instance model radio performance that the cell will provide to a wireless device during one more times, at one or more locations, under one or more cell load levels, with one or more device capabilities, under one or more radio configurations (e.g., multi-connectivity configurations), or the like. The prediction model 24 may model such radio performance for one cell, or for each of multiple cells.

In some embodiments, the prediction model 24 is a machine learning model. The prediction model 24 may for instance be a supervised learning model. In this case, the prediction model 24 may be a regression model, e.g., in the form of a linear regression model, a decision tree model, a neural network model, or the like. Or, the prediction model 24 may be a classification model, e.g., in the form of a logistic regression model or a support vector machine model. In still other embodiments, the prediction model 24 may be an unsupervised learning model, e.g., built based on clustering or dimensionality reduction.

Regardless, with multi-connectivity operation having been exploited for obtaining the radio performance information 18, the model builder 22 effectively builds the prediction model 24 based on measured radio performance that multiple cells respectively provided to a wireless device while the wireless device was simultaneously connected to those cells. This means the prediction model 24 is built based on radio performances that the cells actually provided to a wireless device under the same conditions (e.g., at the same time and/or location), rather than such radio performances being tenuously extrapolated from performance measurements taken for the cells under different conditions (e.g., at different times and/or locations). Some embodiments thereby improve prediction accuracy. Moreover, exploiting multi-connectivity operation in this way may advantageously reduce the burden imposed on wireless devices for training of the prediction model 24, e.g., by reducing the number of measurements, the number of wireless devices, and/or the types of wireless devises needed for training. In embodiments where the model builder 22 builds the prediction model 24 using machine learning, some embodiments may therefore reduce the number of measurements and/or the number of wireless devices needed for training the prediction model 24 during an initial or ongoing training phase.

Note that, in some embodiments, the prediction model 24 models radio performance that a cell will provide in terms of one or more absolute performance metrics, e.g., data throughput, signal strength, signal quality, etc. In other embodiments, the prediction model 24 models radio performance that a cell will provide relative to one or more other cells, e.g., by modeling whether the radio performance the cell will provide is better or worse than the radio performance that another cell will provide. In this latter case, then, the prediction model 24 may be usable to predict whether a certain cell will provide better or worse radio performance than another cell under certain conditions, e.g., at a certain time and/or location. The prediction model 24 may therefore be usable to effectively compare or otherwise analyze the radio performance of different cells under certain conditions.

In any event, with the prediction model 24 built, the network node 16 is configured in some embodiments to make, or configure another network node to make, decisions based on the prediction model 24. Such decisions may include, for example, decisions on mobility of wireless devices, e.g., inter-frequency handover or inter radio access technology handover. Decisions on mobility may involve a decision on which cell is to be a target of a mobility procedure for a wireless device, a decision on which wireless device is to perform a mobility procedure, and/or a decision on where or when a wireless device is to perform a mobility procedure. As one example, then, the network node 16 may make, or configure another network node to make, a decision that a wireless device is to perform a mobility procedure, based on the prediction model 24 predicting a source cell will provide radio performance below a threshold at a certain time and/or at a certain location and/or predicting a target cell will provide radio performance above a threshold at the certain time and/or at the certain location. In these and other embodiments, the network node 16 may effectively steer wireless devices towards a cell for which the prediction model 24 has a prediction accuracy below a threshold.

Alternatively or additionally, the decisions made based on the prediction model 24 may include decisions on scheduling of wireless devices. Such decisions may include for instance a decision on which wireless device is to be prioritized for scheduling and/or a decision on when a wireless device is to be scheduled. As one example, the network node 16 may make, or configure another network node to make, a decision that a wireless device is to be prioritized for scheduling before the wireless device arrives at a location where, according to the prediction model 24, one or more cells will provide radio performance below a threshold.

Alternatively or additionally, the decisions made based on the prediction model 24 may include decisions on radio configuration of wireless devices. Such decisions may include for instance a decision on whether or how to configure multi-connectivity operation of a wireless device, a decision on whether or how to configure carrier aggregation for a wireless device, a decision on whether or how to configure power boosting for a wireless device, and/or a decision on whether or how to configure transmission time interval, TTI, bundling for a wireless device. As one example, the network node 16 may make, or configure another network node to make, a decision that a wireless device is to be configured with a certain radio configuration before the wireless device arrives at a location where, according to the prediction model 24, one or more cells will provide radio performance below a threshold.

More particularly, in the context of dual connectivity, the network node 16 may collect performance metrics associated to a wireless device, e.g., via a Minimization of Drive Test (MDT) framework wherein the immediate MDT can be configured for a given wireless device. Based on this configuration, at least one amongst the wireless device and the associated radio network nodes (MN and SN) reports the performance measurements (e.g., throughput measurements, delay measurements etc.) to the network node 16 in the form of an OAM node. Based on this measurement, the network node 16 gets to monitor the performance as experienced by the wireless device on the master leg and the secondary leg and can build the prediction model 24 accordingly.

Building the machine learning prediction model between each wireless device source and target node pair would heretofore require a substantial amount of wireless devices to be handed over from the source to target node before the prediction model 24 could be built, i.e., before enough data could be collected to build the prediction model 24. This would lead to sub-optimal network performance during the training time. Moreover, statistics collected during mobility procedures on source and target nodes would not show the performance of communication channels on source and target cells at the same time and in the same location. Namely, the measurements that would be taken during a handover process would represent monitoring of the communication channels on the source cell first and on the target cell only after the handover. Heretofore, then, it was not possible to collect statistics that show in a given location and at a given point in time what is the performance of communication channels for a given wireless device with both source cell and target cell.

Some embodiments herein exploit dual-connectivity to get simultaneous measurements on multiple node. Moreover, some embodiments herein provide inter-node communication for device-specific radio performance indicators (e.g., performance monitoring key performance indicators, KPIs). Such inter-node communication may include communication between MN and SN for exchanging device-specific radio performance indicators, thereby enabling comparison of radio performance on the master and secondary legs. In this case, where the network node 16 corresponds to the MN, the MN may build a prediction model for predicting radio performance provided by a cell of the SN. Alternatively or additionally, the network node 16 may correspond to the SN such that the SN builds a prediction model for predicting radio performance provided by a cell of the MN.

In some embodiments, for example, the network node that collects the measurements from both MN and the SN can compare the measurements to analyze which network node performed better for the UE (which may in turn help in predicting performance in the future for the same or different UEs). The use of this data can be made together with further information on the UE, such as UE capabilities and the specific configuration the UE has been assigned. For example, if the UE is limited to a single channel UL capability, this UE will not be able to be configured with dual channel UL. For this reason its UL performance may be lower than that of a UE that is capable of dual channel UL. However, to interpret this performance in a way that takes all factors into account, the network node that analyzes data from master and secondary nodes needs to know such details about the UE. By feeding a ML (machine learning) algorithm with the measurements related like the UE's location (geo location and/or radio location), the UE's performance metric (e.g., throughput measurement) on the MN and SN, cell load of PCell, cell load of PCell's intra-frequency neighbors, cell load of PSCell, cell load of PSCell's intra-frequency neighbors, data channel measurements on master and secondary cell, the network node can create a number of optimal decision criteria for a decision.

For example, the network node can decide which UEs are to be subjected to inter frequency handover wherein the decision criterion can estimate the UE's expected performance in the target frequency in an accurate way before performing the handover. Such decision can take into account the location of a second UE, and measurements related to the different neighbouring cells collected in the previous steps. For example, if for a first UE previously configured with DC it was reported bad performances on the second network node in a given location, and handover was triggered for such first UE to a third network node or leg switch to a first network node was triggered, the second UE may be handed over to the third network node or to another network node different from the second network node.

As another example, the network node can decide which cell to select as the best handover target in situations where it is not possible to collect UE measurements of target cells (e.g. blind handovers).

As another example, the network node can decide what is the best performance for different dual connectivity configurations between master and source cells at different load levels. For example, the node collecting data from master and secondary nodes may deduce that certain dual connectivity configurations perform better than others when loads are above a given level. Additionally, one network node can predict UE performances when the UE is approaching a location where DC performances are expected to be good or bad. For example, one network node can prioritize the scheduling of the UE before approaching a region where the performances of the other network node are expected to be bad or enable certain features (carrier aggregation, power boosting, TTI bundling, etc.), or prepare in advance the handover to another network node.

Some embodiments herein may alternatively or additionally be employed in a context where the wireless communication network 10 includes cells deployed on multiple frequency layers, referred to as carriers. The network node 16 in this case may exploit the prediction model 24 to perform load balancing for balancing the traffic load between overlaid cells in the network 10, e.g., in order to utilize the capacity on the different frequency layers. Potential opportunities for load balancing are illustrated with arrows in FIG. 3.

Figure 3:
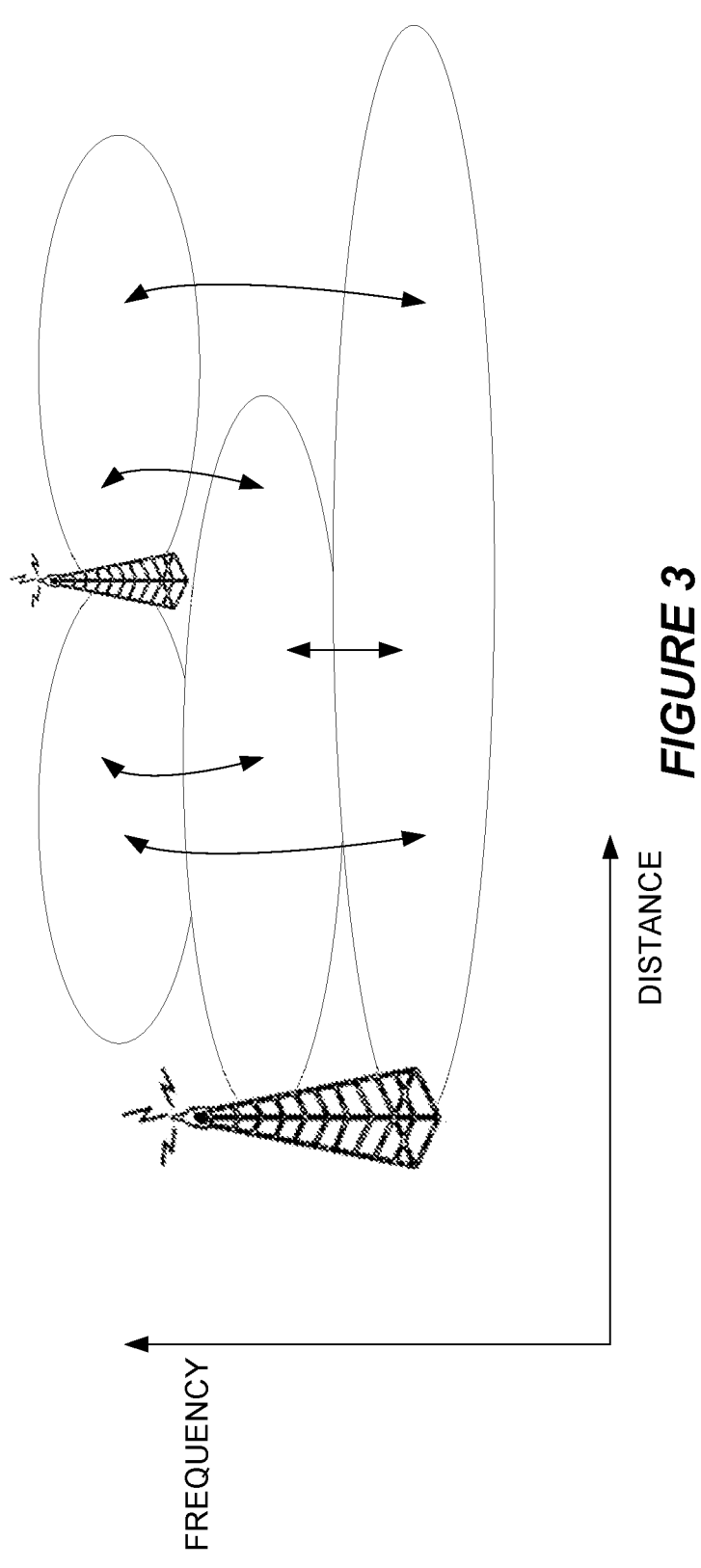
FIG. 3 is a block diagram of load balancing according to some embodiments.

As shown in FIG. 3, each eNB (or gNB in an NR system) assesses the traffic load in its cell(s). The traffic load information can be exchanged between the cells, after which a load balancing algorithm exploiting the prediction model 24 identifies whether there is a need to move users between the cells in order to balance the traffic load. If there is a need to move users in order to balance the traffic load, users are selected and ordered to perform inter-frequency measurements in order to be moved in some way (handover, release with redirect, etc.). The network node 16 in FIG. 1 may be exploited centrally so as to implement such a load balancing algorithm for each of multiple cells at the same network node 16. Or, in other embodiments, the network node 16 in FIG. 1 may represent each of multiple radio network nodes serving a cell such that the load balancing algorithm is implemented on a cell by cell or radio network node by radio network node basis.

Regardless, the load balancing algorithm exploits the prediction model 24 to select the best frequency for each UE, in order to minimize the load of the entire network, or to maximize the UE throughput. Finding the best frequency and target node for a UE can be predicted using the prediction model 24, e.g., where measurements on the UE serving node and carrier in combination with load information on the target node can enable for example throughput prediction, which can be used to select the target node.

Note that in some embodiments the network node 16 may effectively steer the traffic split between a MN and a SN based on the accuracy or performance of the prediction model 24. For example, the network node 16 may allocate more traffic towards the MN if the prediction model 24 for predicting MN performance has an accuracy below a threshold, e.g., to promote collection of more training data for the prediction model 24. Or, the network node 16 may allocate more traffic towards the SN if the prediction model 24 for predicting SN performance has an accuracy below a threshold. In some embodiments, the MN and/or SN may signal their ability to predict each other's performance to the network node 16.

Note also that the radio performance information 18 may include any type of information that indicates radio performance provided to a wireless device by a cell. The radio performance information 18 may for example include a measurement quantity associated to the cell, e.g., in terms of Reference Signal Received Power (RSRP), Reference Signal Received Quality (RSRQ), Signal-to-Interference-Plus-Noise Ratio (SINR). The measurement quantity may for instance be reported by a wireless device to the radio network node serving the cell, e.g., a quantity indicating radio performance provided by a PCell may be reported to a Master Node (MN) whereas a quantity indicating radio performance provided by a PSCell may be reported to a Secondary Node (SN). Alternatively or additionally, the radio performance information 18 may include a measurement quantity associated to a neighbor cell of the cell, e.g., in terms of RSRP, RSRQ, or SINR. Alternatively or additionally, the radio performance information 18 for a cell may include Radio Link Control (RLC) throughput measurements, spectral efficiency information, packet error rate measurements, packet delay measurements, or the like. Any or all of these may be indicated individually for uplink and downlink. Packet delay measurements may take the form of Packet Data Convergence Protocol (PDCP) queueing delay (as reported by a wireless device), over-the-air transmission delay, RLC delay, and/or F1-U delay, e.g., as collected by a radio network node distributed unit (such as gNB-DU). Alternatively or additionally, the radio performance information 18 may include packet loss rate measurements such as air interface packet delay ratio and/or F1-U packet delay ratio. Alternatively or additionally, the radio performance information 18 may include data channel information such as channel quality indicators (CQIs), block error rate (BLER) measurements, Channel State Information Reference Signal (CSI-RS) measurements, signal-to-noise-ratio (SNR), SINR, or the like.

Note also that the radio performance information 18 may include, or be mapped to, any type of information that indicates conditions under which the radio performance provided by a cell was measured. For example, the radio performance information 18 may include or be mapped to a timestamp at which radio performance measurements were performed or collected and/or a location of a wireless device or network node which performed or collected the measurements (e.g., in terms of a Global Navigation Satellite System, GNSS-based location, a Wireless Local Area Network or Bluetooth measurements based location, a sensor-based location, a radio based location such as Enhanced Cell ID, Observed Time Difference of Arrival or Uplink Time Difference of Arrival based location, etc.). Alternatively or additionally, the radio performance information 18 may include or be mapped to onboard sensor information of a wireless device, such as information indicating acceleration, direction/orientation, speed, or the like. Alternatively or additionally, the radio performance information 18 may include or be mapped to an averaging period used for computation of the radio performance measurement, e.g., if the measurement is an averaged value. Alternatively or additionally, the radio performance information 18 may include or be mapped to load information of the cell and/or load information of a neighbor cell. The granularity of the load information may be in terms of per cell, per Synchronization Signal Block (SSB) beam (or beam group) coverage area, per CSI-RS beam (or beam group) coverage area, per network slice, per network slice group, or any combination thereof. The load information may be indicated, for instance, in terms of composite available capacity (CAC), resource block utilization, transport network layer load associated with one or more network interfaces such as F1, E1, X2, Xn, etc., hardware load, number of active wireless devices, number of wireless devices in Radio Resource Control (RRC) CONNECTED mode, or the like.

In view of the above modifications and variations, FIG. 4 depicts a method performed by a network node 16 in accordance with particular embodiments. The method in some embodiments includes obtaining, for each of one or more wireless devices, radio performance information 18 indicating measured radio performances that multiple cells respectively provided to the wireless device while the wireless device was simultaneously connected to the multiple cells in multi-connectivity operation under certain conditions (Block 400). In some embodiments, at least some of the radio performance information 18 is received from another network node. Alternatively or additionally, at least some of the radio performance information 18 may be inferred or deduced. Regardless of how the radio performance information 18 is obtained, the method may also comprise, based on the obtained radio performance information 18, building a prediction model 24 which models radio performance that a cell will provide under one or more conditions (Block 410). The method may further comprise making, or configuring another network node to make, decisions on mobility, scheduling, and/or radio configuration of wireless devices based on the prediction model 24 (Block 420).

In some embodiments, the method also comprises steering wireless devices towards a cell for which the prediction model 24 has a prediction accuracy below a threshold (Block 430).

In some embodiments, the radio performance information 18 obtained for a wireless device 20A indicates measured radio performances that multiple cells respectively provided to the wireless device 20A while the wireless device 20A was simultaneously connected to the multiple cells in multi-connectivity operation during certain times. Additionally or alternatively, the radio performance information 18 obtained for a wireless device 20A indicates measured radio performances that multiple cells respectively provided to the wireless device 20A while the wireless device 20A was simultaneously connected to the multiple cells in multi-connectivity operation at certain locations. In some embodiments, the prediction model 24 models radio performance that a cell will provide to a wireless device 20A during one or more times and/or at one or more locations.

In some embodiments, the radio performance information 18 obtained for a wireless device 20A indicates measured radio performances that multiple cells respectively provided to the wireless device 20A while the wireless device 20A was simultaneously connected to the multiple cells in multi-connectivity operation using a certain radio configuration. In some embodiments, the prediction model 24 models radio performance that a cell will provide to a wireless device 20A under one or more radio configurations. In one or more of these embodiments, the certain radio configuration is a multi-connectivity configuration, and the one or more radio configurations are one or more multi-connectivity configurations.

In some embodiments, the radio performance information 18 obtained for a wireless device 20A indicates measured radio performances that multiple cells respectively provided to the wireless device 20A while the wireless device 20A was simultaneously connected to the multiple cells in multi-connectivity operation with certain device capabilities. In some embodiments, the prediction model 24 models radio performance that a cell will provide to a wireless device 20A with one or more device capabilities.

In some embodiments, the method comprises making, or configuring another network node to make, decisions on mobility of wireless devices based on the prediction model 24. In some embodiments, mobility comprises inter-frequency mobility or inter radio access technology mobility.

In some embodiments, the method comprises making, or configuring another network node to make, decisions on mobility of wireless devices based on the prediction model 24. In some embodiments, decisions on mobility include at least one of any one or more of a decision on which cell is to be a target of a mobility procedure for a wireless device 20A, a decision on which wireless device 20A is to perform a mobility procedure, and a decision on where or when a wireless device 20A is to perform a mobility procedure.

In some embodiments, the method comprises making, or configuring another network node to make, decisions on scheduling of wireless devices based on the prediction model 24. In some embodiments, making, or configuring another network node to make, decisions on scheduling of wireless devices based on the prediction model 24 comprises making, or configuring another network node to make, a decision that a wireless device 20A is to be prioritized for scheduling before the wireless device 20A arrives at a location where, according to the prediction model 24, one or more cells will provide radio performance below a threshold.

In some embodiments, the method comprises making, or configuring another network node to make, decisions on radio configuration of wireless devices based on the prediction model 24. In some embodiments, said decision on radio configuration comprise at least one of any one or more of a decision on whether or how to configure multi-connectivity operation of a wireless device 20A, a decision on whether or how to configure carrier aggregation for a wireless device 20A, a decision on whether or how to configure power boosting for a wireless device 20A, and a decision on whether or how to configure transmission time interval, TTI, bundling for a wireless device 20A.

In some embodiments, obtaining radio performance information 18 comprises inferring or deducing at least some of the radio performance information 18. In some embodiments, inferring or deducing at least some of the radio performance information 18 comprises inferring or deducing radio performance information 18 that indicates radio performance of a cell, based on a type or content of one or more messages received or intercepted from a radio network node 16 providing the cell, a change in an extent to which the cell transmits or receives user plane traffic to a wireless device 20A, whether the cell has transmitted or received user plane traffic to a wireless device 20A within a certain time interval, and/or a change in an allocation of resources for transmitting or receiving user plane traffic to a wireless device 20A in the cell.

In some embodiments, the network node 16 is a radio network node configured as a master radio network node for multi-connectivity operation of a wireless device 20A, a secondary radio network node for multi-connectivity operation of a wireless device 20A, or an operation and maintenance node.

In some embodiments, configuring another network node to make decisions on mobility, scheduling, and/or radio configuration of wireless devices based on the prediction model 24 comprises transmitting the prediction model 24 to the other network node.

In some embodiments, the prediction model 24 is a machine learning model built using machine learning.

In some embodiments, radio performance information 18 that indicates measured radio performance that a cell provides to a wireless device 20A comprises at least one of any one or more of measured reference signal strength or quality of the cell, measured reference signal strength or quality of a neighbor cell of the cell, measured radio link control throughput of the cell, measured spectral efficiency of the cell, measured packet error rate of the cell, measured packet delay of the cell, measured packet loss rate of the cell, measured channel quality information of the cell, and measured block error rate of the cell.

FIG. 5 depicts a method performed by a network node 16 in accordance with other particular embodiments. The method in some embodiments includes obtaining a prediction model 24 which models radio performance that a cell will provide under one or more conditions (Block 500). The prediction model 24 is based on radio performance information 18 for each of one or more wireless devices which indicates measured radio performances that multiple cells respectively provided to the wireless device while the wireless device was simultaneously connected to the multiple cells in multi-connectivity operation under certain conditions. The method may also comprise making, or configuring another network node to make, decisions on mobility, scheduling, and/or radio configuration of wireless devices based on the prediction model 24 (Block 510).

In some embodiments, the prediction model 24 models radio performance that a cell will provide to a wireless device 20A during one or more times. Additionally or alternatively, the prediction model 24 models radio performance that a cell will provide to a wireless device 20A at one or more locations. Additionally or alternatively, the prediction model 24 models radio performance that a cell will provide to a wireless device 20A under one or more cell load levels. Additionally or alternatively, the prediction model 24 models radio performance that a cell will provide to a wireless device 20A under one or more radio configurations. Additionally or alternatively, the prediction model 24 models radio performance that a cell will provide to a wireless device 20A with one or more device capabilities. In one or more of these embodiments, the prediction model 24 models radio performance that a cell will provide to a wireless device 20A under one or more radio configurations. In this case, the one or more radio configurations are one or more multi-connectivity configurations.

In some embodiments, the method comprises making, or configuring another network node to make, decisions on mobility of wireless devices based on the prediction model 24. In some embodiments, mobility comprises inter-frequency mobility or inter radio access technology mobility.

In some embodiments, the method comprises making, or configuring another network node to make, decisions on mobility of wireless devices based on the prediction model 24. In some embodiments, decisions on mobility include at least one of any one or more of a decision on which cell is to be a target of a mobility procedure for a wireless device 20A, a decision on which wireless device 20A is to perform a mobility procedure, and a decision on where or when a wireless device 20A is to perform a mobility procedure.

In some embodiments, the method comprises making, or configuring another network node to make, decisions on scheduling of wireless devices based on the prediction model 24. In some embodiments, making, or configuring another network node to make, decisions on scheduling of wireless devices based on the prediction model 24 comprises making, or configuring another network node to make, a decision that a wireless device 20A is to be prioritized for scheduling before the wireless device 20A arrives at a location where, according to the prediction model 24, one or more cells will provide radio performance below a threshold.

In some embodiments, the method comprises making, or configuring another network node to make, decisions on radio configuration of wireless devices based on the prediction model 24. In some embodiments, the decision on radio configuration comprises at least one of any one or more of a decision on whether or how to configure multi-connectivity operation of a wireless device 20A, a decision on whether or how to configure carrier aggregation for a wireless device 20A, a decision on whether or how to configure power boosting for a wireless device 20A, and a decision on whether or how to configure transmission time interval, TTI, bundling for a wireless device 20A.

In some embodiments, the network node 16 is a radio network node configured as a master radio network node for multi-connectivity operation of a wireless device 20A, a secondary radio network node for multi-connectivity operation of a wireless device 20A, or an operation and maintenance node.

In some embodiments, the prediction model 24 is a machine learning model built using machine learning.

In some embodiments, radio performance information 18 that indicates measured radio performance that a cell provides to a wireless device 20A comprises at least one of any one or more of measured reference signal strength or quality of the cell, measured reference signal strength or quality of a neighbor cell of the cell, measured radio link control throughput of the cell, measured spectral efficiency of the cell, measured packet error rate of the cell, measured packet delay of the cell, measured packet loss rate of the cell, measured channel quality information of the cell, and measured block error rate of the cell.

Embodiments herein also include corresponding apparatuses. Embodiments herein for instance include a network node 16 configured to perform any of the steps of any of the embodiments described above for the network node 16.

Embodiments also include a network node 16 comprising processing circuitry and power supply circuitry. The processing circuitry is configured to perform any of the steps of any of the embodiments described above for the network node 16. The power supply circuitry is configured to supply power to the network node 16.

Embodiments further include a network node 16 comprising processing circuitry. The processing circuitry is configured to perform any of the steps of any of the embodiments described above for the network node 16. In some embodiments, the network node 16 further comprises communication circuitry.

Embodiments further include a network node 16 comprising processing circuitry and memory. The memory contains instructions executable by the processing circuitry whereby the network node 16 is configured to perform any of the steps of any of the embodiments described above for the network node 16.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 6:
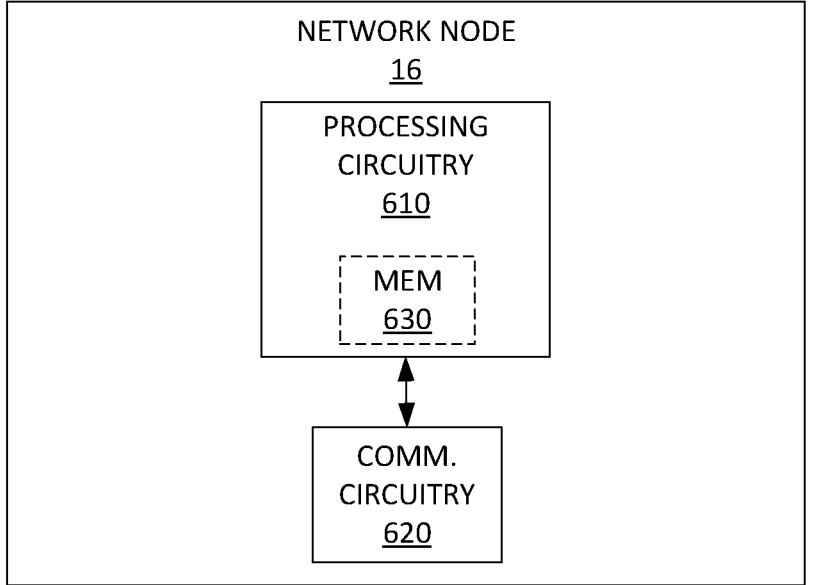
FIG. 6 is a block diagram of a network node according to other embodiments.

FIG. 6 for example illustrates a network node 16 as implemented in accordance with one or more embodiments. As shown, the network node 16 includes processing circuitry 610 and communication circuitry 620. The communication circuitry 620 is configured to transmit and/or receive information to and/or from one or more other nodes, e.g., via any communication technology. The processing circuitry 610 is configured to perform processing described above, e.g., in FIGS. 4 and/or 5, such as by executing instructions stored in memory 630. The processing circuitry 610 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Note that although embodiments above have been described with respect to cells, embodiments herein are extendable to any type of link (e.g., frequency carrier, beam, bandwidth part, radio leg, etc.) to which a wireless device may simultaneously connect in multi-connectivity operation.

Other embodiments herein include methods such that a master node and a secondary node in dual connectivity can exchange performance measurements for a specific UE, or can infer the performance measurement for a specific UE. The so exchanged performance measurements can be used by the master node and/or the secondary node for different algorithm tuning, e.g., inter-frequency handovers. These embodiments may be applicable both for the case of MN terminated bearers and SN terminated bearers.

Embodiments herein for example include a method performed by a first network node (master node), for enabling inter-frequency performance comparisons. The method includes one or more of the following steps.

Step 1: Selecting a UE in dual-connectivity mode.

Step 2: Identifying a second network node associated to a secondary cell group of the selected UE.

Step 3: Transmitting a request to the second network node for collecting the performance measurements associated to the said UE.

Step 4: Collecting master cell group related performance measurements for the said UE.

Step 5: Transmitting a performance measurement report associated to the said UE to the second network node.

Step 6: Receiving a performance measurement report associated to the said UE from the second network node.

Step 7: Analysing and comparing the performances of master and secondary node cells in order to optimize UE related policies taking into account the collected measurement in the master cell group, the received performance measurement in related to the secondary cell group, and (optionally) the UE location information.

Step 8: Selecting a second UE

Step 9: On the basis of a plurality of parameters, such as UE location and/or UE capability, applying a certain number of actions, such as target cell selection at handover/load balancing, scheduling prioritization, carrier aggregation activation/release, power boosting, etc.

Other embodiments herein include a method performed by the second network node (secondary node), for enabling inter-frequency performance comparisons. The method may comprise one or more of:

Step 1: Receiving a request from the first network node for collecting the performance measurements associated to a UE.

Step 2: Collecting the secondary cell group related performance measurements for the said UE.

Step 3: Transmitting the performance measurement report associated to the said UE to the first network node.

Step 4: Receiving the performance measurement report associated to the said UE from the first network node.

Step 5: Analysing and comparing the performances of master and secondary node cells in order to optimize UE related policies, taking into account the collected measurement in the secondary cell group, the received performance measurement related to the master cell group, and (optionally) the UE location information; and/or Step 6: Selecting a second UE.

Step 7: On the basis of a plurality of parameters, such as UE location and/or UE capability, applying a certain number of actions, such as target cell selection at handover/load balancing, scheduling prioritization, carrier aggregation activation/release, power boosting, etc.

Yet other embodiments herein include a method performed by a fourth node, such fourth node being a node connecting to master and secondary nodes and able to configure master and secondary nodes with policies of various type such as policies for mobility load balancing. The fourth node may be the so called non Real Time RAN Intelligent Controller (RIC) in the Open RAN (ORAN) specifications. The method focuses on enabling inter-frequency performance comparisons. The method may comprise one or more of:

Step 1: Receiving a request at the first network node from the fourth node, for collecting the performance measurements associated to a UE.

Step 2: Receiving a request at the second network node from the fourth node, for collecting the performance measurements associated to a UE.

Step 3: Collecting the master and the secondary cell group related performance measurements for the said UE.

Step 4: Analysing and comparing the performances of master and secondary node cells in order to optimize UE related policies.

Step 5: Selecting a second UE.

Step 6: On the basis of a plurality of parameters, such as UE location and/or UE capability, applying the information collected for a certain number of actions, such as target cell selection at handover/load balancing, scheduling prioritization, carrier aggregation activation/release, power boosting, etc.

Consider now embodiments for SN initiated data collection. These embodiments are the same as those above, except for replacing MN+MCG+primary/master and SN+SCG+secondary terminologies with each other.

In particular, embodiments herein include a method performed by the first network node (secondary node), for enabling inter-frequency performance comparisons. The method comprises one or more of the following steps.

Step 1: Selecting a UE in dual-connectivity mode.

Step 2: Identifying a second network node associated to the primary cell group of the selected UE.

Step 3: Transmitting a request to the second network node or collecting the performance measurements associated to the said UE.

Step 4: Collecting the secondary cell group related performance measurements for the said UE.

Step 5: Transmitting a performance measurement report associated to the said UE to the second network node.

Step 6: Receiving a performance measurement report associated to the said UE from the second network node.

Step 7: Analyzing and comparing the performances of master and secondary node cells in order to optimize UE related policies.

Step 8: Selecting a second UE.

Step 9: On the basis of a plurality of parameters, such as UE location and/or UE capability, applying a certain number of actions, such as target cell selection at handover/load balancing, scheduling prioritization, carrier aggregation activation/release, power boosting, etc.

Embodiments may also include a method performed by the second network node (master node), for enabling inter-frequency performance comparisons, the method comprising one or more of the following steps.

Step 1: Receiving a request from the first network node for collecting the performance measurements associated to a UE.

Step 2: Collecting primary cell group related performance measurements for the said UE.

Step 3: Transmitting a performance measurement report associated to the said UE to the first network node.

Step 4: Receiving a performance measurement report associated to the said UE from the first network node.

Step 5: Analyzing and comparing the performances of master and secondary node cells in order to optimize UE related policies.

Step 6: Selecting a second UE.

Step 6: On the basis of a plurality of parameters, such as UE location and/or UE capability, applying a certain number of actions, such as target cell selection at handover/load balancing, scheduling prioritization, carrier aggregation activation/release, power boosting, etc.

Embodiments further include a method performed by a fourth network node as described above.

Consider next embodiments where the MN and the SN infer the performance measurement for a specific UE in the SN and in the MN respectively, without exchanging any performance measurement. The first network node can be either the node hosting the Packet Data Convergence Protocol (PDCP) (MN terminated bearer), or the node not hosting the PDCP (SN terminated bearer).

In this case, embodiments include a method performed by the first network node (master node), for enabling inter-frequency performance comparisons, the method comprising one or more of the following steps Step 1: Selecting a UE in dual-connectivity mode.

Step 2: Identifying a second network node associated to the secondary cell group of the selected UE.

Step 3: Receiving a message from the second network node indicating to release or modify the second network node resources for the selected UE, e.g. Protocol Data Unit (PDU) session modification/release.

Step 4: Detecting that the user plane message flow over the X2 in uplink (UL)/downlink (DL) from/to the secondary node has been activated/deactivated/resumed by the secondary node.

Step 5: Transmitting a message to the second network node indicating a request to release or modify the second network node resources for the selected UE, e.g. PDU session modification/release, or a message to activate/deactivate/resume the DL/UL traffic flow over the X2 to/from the second network node.

Step 6: Collecting the master cell group related performance measurements for the said UE.

Step 7: Combining the information retrieved in related to the second network node with the collected measurement in the master cell group.

Step 8: Selecting a second UE.

Step 9: On the basis of a plurality of parameters, such as UE location and/or UE capability, applying a certain number of actions, such as target cell selection at handover/load balancing, scheduling prioritization, carrier aggregation activation/release, power boosting, etc.

Embodiments also include a method performed by the second network node (second node), for enabling inter-frequency performance comparisons, the method comprising one or more of the following steps.

Step 1: Selecting a UE in dual-connectivity mode.

Step 2: Identifying a first network node associated to the master cell group of the selected UE.

Step 3: Receiving a message from the first network node indicating to release or modify the second network node resources for the selected UE, e.g. PDU session modification/release.

Step 4: Detecting that the user plane message flow in UL and/or DL over the second node is activated/deactivated/resumed by the first node.

Step 5: Transmitting a message to the first network node indicating a request to release or modify the second network node resources for the selected UE, e.g. PDU session modification/release, or a message to activate/deactivate/resume the DL/UL traffic flow over the X2 to/from the second network node.

Step 6: Collecting the secondary cell group related performance measurements for the said UE.

Step 7: Combining the information retrieved in with the collected measurement in the master cell group.

Step 8: Selecting a second UE.

Step 9: On the basis of a plurality of parameters, such as UE location and/or UE capability, apply for a certain number of actions, such as target cell selection at handover/load balancing, scheduling prioritization, carrier aggregation activation/release, power boosting, etc.

In some embodiments, the receiving action implies the second network node sending a message to the first network node indicating the request to modify/release the second network node resources, related to one or more PDU sessions/Data Radio Bearers (DRBs). For example, the second network node may indicate the request of SN modification upon triggering handover of the PSCell to another cell, or the release of the SN upon receiving UE measurement. The second network node may also request to switch the traffic from/to the first network node to/from the secondary network configuration, for example including a request to change the UL/DL configuration from MN/SN UL-only traffic to both MN and SN traffic, as a consequence of DL/UL measurements performed in the secondary network.

Such message may include a plurality of measurements, such as the location information, the latest DL RSRP estimated over the PSCell (or SINR measured in UL by the gNB), the frequency/Physical Cell Identity (PCI) and RSRP of the new PSCell to which the UE is handed-over, as well as the cause of the modification/release, e.g. overload, mobility, UL/DL link outage, etc.

In some embodiments, the detecting action implies the first network node monitoring the user plane (UP) traffic transmitted over the X2 to identify an indication from the second network node of the traffic to be switched from/to the first network node. For example, the first network node may receive a message over the X2 from the second node indicating that this is the last message being sent over the X2 due to degraded UL/DL performance in the second node, or indicating that the traffic over the second network node can be (re) activated/resumed due to UL/DL expected performance being satisfactory. The message may also include radio information such as the latest estimated DL RSRP in the second network node, UL SINR, as well as the location information, and a plurality of possible measurements disclosed such as secondary node load status. Such message may be, for example, the DL Data Delivery Status message sent by the node not hosting the NR PDCP entity (i.e. the SN in case of MN terminated bearer or the MN in case of SN terminated bearers) or a message sent by the node hosting the NR PDCP to flush the DL data to be transmitted by the node not hosting the NR PDCP (i.e. the SN in case of MN terminated bearer or the MN in case of SN terminated bearers).

Additionally, the first network node may monitor the UP UL traffic sent over the X2 by the second network node, and assume that there is an UL performance degradation in the second network node, if UP UL traffic is not detected for a certain period or that UL traffic detected over the X2 is bursty.

In some embodiments, the transmitting action implies indicating a request to release or modify the second network node resources for the selected UE, e.g. PDU session modification/release, or a message to activate/deactivate/resume the DL/UL traffic flow over the X2 to/from the second network node. For example, this could be due to received B1 measurements related to the cell hosted in the second network node, or in the case of SN terminated bearers a message indicating that this is the last message being sent over the X2 due to degraded UL/DL performance in the first node, or indicating that the traffic over the first network node can be (re) activated/resumed due to UL/DL expected performance being satisfactory, or a message indication radio information experienced over the first network node. As disclosed above for the detecting action, such message could be the DL Data Delivery Status message sent by the MN to the SN (i.e. in case of SN terminated bearer), or a message to flush the DL data in the second network node, when for example the radio information received in from the second network node shows a degradation in the second network node.

Similarly, the second network node can be either the node hosting the PDCP (SN terminated bearer), or the node not hosting the PDCP (MN terminated bearer). In some embodiments, the first/second network node may infer inter-frequency performances when the UE is configured with DC. For example, the first (second) network node can infer performances and coverage in the second (first) network node for a UE when this UE is in a given location, by for example receiving an indication from the second (first) network node that the is UE handed over from the SN (MN) to a third network node hosting another SN (MR), or that the UL/DL traffic leg should be switched to/from the SN (MR) from/to the MN (SN) due to degraded UL/DL performance or improved UL/DL performances.

Certain embodiments may advantageously reduce the need for standalone (with no DC-capabilities) UEs to collect the data related to inter-frequency handover performance evaluation.

In any of the above embodiments, the first network node may be an NR node. In some other embodiments, the first network node is an LTE node. In some embodiments, the second network node is an NR node. In some other embodiments, the second network node is an LTE node. The fourth network node may connect to both LTE and NR nodes.

Some measurements above can be collected by the network itself whereas some other measurements require the UE to perform the measurements and send the report. If the UE is required to perform the measurements (e.g., RSRP/RSRQ/SINR measurements, location information, PDCP queueing delay measurements, DL throughput, as well as onboard sensors information, such as acceleration, direction/orientation, speed, data channel measurements such as CQI measurements, CSI-RS measurements, power headroom), then the associated MN/SN shall configure the UE to perform the required measurements and receive the measurement reports from the UE. Then the steps above may further involve: (i) Sending the measurement configuration to the said UE; and (ii) Receiving the measurement reports from the said UE.

In case of embodiments involving a fourth network node, the fourth network node would signal to the first and second network nodes instructions to configure measurements at the UE.

Further, though the network can collect the measurements itself without the UE's explicit reporting, the network node (CU-CP, CU-UP or the DU) that collects the information could be different from the network node that is initiating the measurements. Here, CU-CP stands for Central Unit (CU) Control Plane (CP), CU-UP stands for CU User Plane (UP), and DU stands for Distributed Unit (DU). In such a scenario, the network node that initiates the measurement collection can transmit the measurement configuration to the network node that is supposed to perform the measurement. Then the steps above further involve: (i) Sending the measurement configuration to the third network node (e.g., DU); and (ii) Receiving the measurement reports from the third network node.

Figure 7:
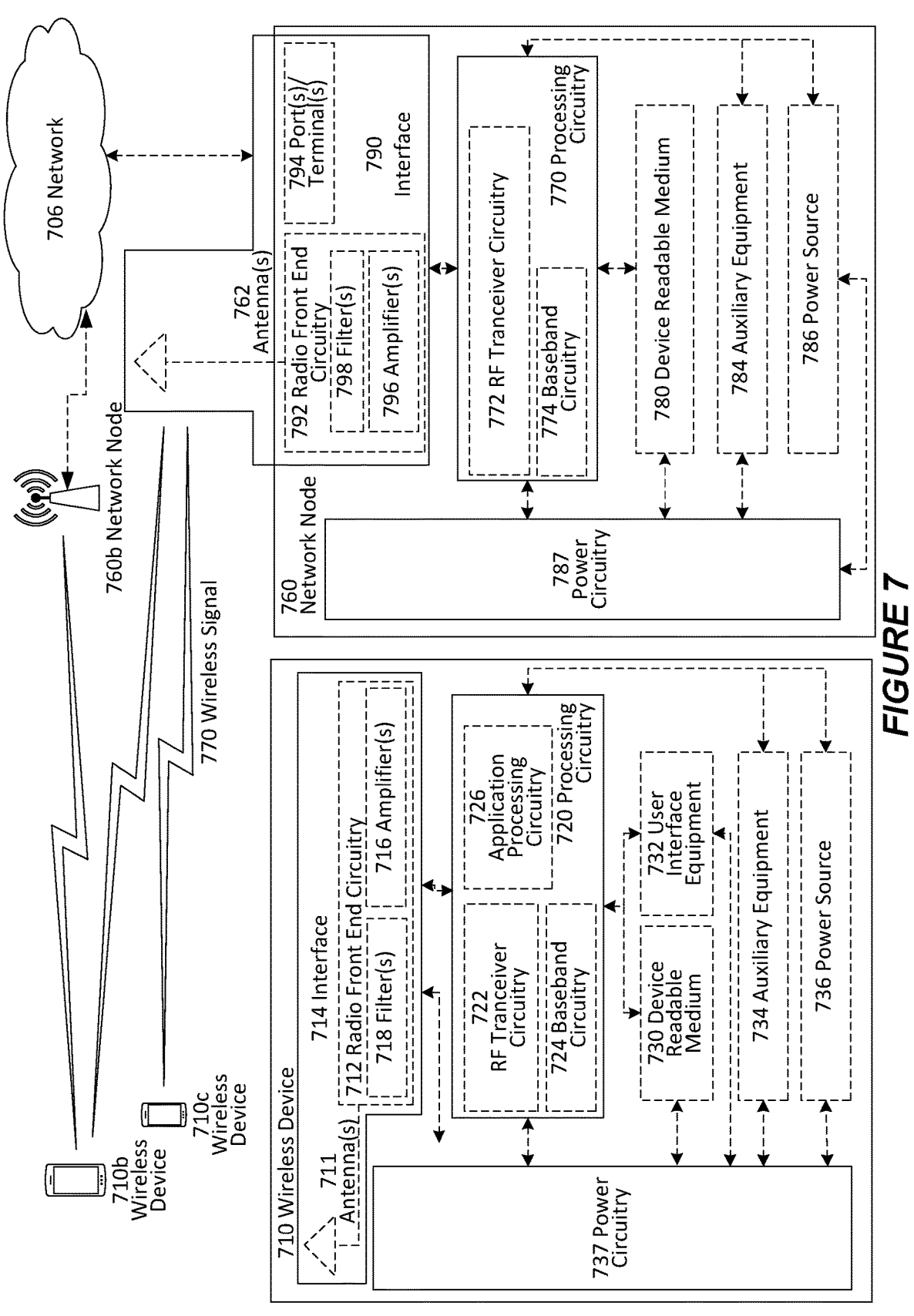
FIG. 7 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network 706, network nodes 760 and 760b, and WDs 710, 710b, and 710c. In practice, a wireless network may further include any additional elements suitable to support communication between wireless devices or between a wireless device and another communication device, such as a landline telephone, a service provider, or any other network node or end device. Of the illustrated components, network node 760 and wireless device (WD) 710 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 706 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 760 and WD 710 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node 760 includes processing circuitry 770, device readable medium 780, interface 790, auxiliary equipment 784, power source 786, power circuitry 787, and antenna 762. Although network node 760 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 760 are depicted as single boxes located within a larger box, or nested within multiple boxes, in practice, a network node may comprise multiple different physical components that make up a single illustrated component (e.g., device readable medium 780 may comprise multiple separate hard drives as well as multiple RAM modules).

Similarly, network node 760 may be composed of multiple physically separate components (e.g., a NodeB component and a RNC component, or a BTS component and a BSC component, etc.), which may each have their own respective components. In certain scenarios in which network node 760 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 760 may be configured to support multiple radio access technologies (RATs). In such embodiments, some components may be duplicated (e.g., separate device readable medium 780 for the different RATs) and some components may be reused (e.g., the same antenna 762 may be shared by the RATs). Network node 760 may also include multiple sets of the various illustrated components for different wireless technologies integrated into network node 760, such as, for example, GSM, WCDMA, LTE, NR, WiFi, or Bluetooth wireless technologies. These wireless technologies may be integrated into the same or different chip or set of chips and other components within network node 760.

Processing circuitry 770 is configured to perform any determining, calculating, or similar operations (e.g., certain obtaining operations) described herein as being provided by a network node. These operations performed by processing circuitry 770 may include processing information obtained by processing circuitry 770 by, for example, converting the obtained information into other information, comparing the obtained information or converted information to information stored in the network node, and/or performing one or more operations based on the obtained information or converted information, and as a result of said processing making a determination.

Processing circuitry 770 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 760 components, such as device readable medium 780, network node 760 functionality. For example, processing circuitry 770 may execute instructions stored in device readable medium 780 or in memory within processing circuitry 770. Such functionality may include providing any of the various wireless features, functions, or benefits discussed herein. In some embodiments, processing circuitry 770 may include a system on a chip (SOC).

In some embodiments, processing circuitry 770 may include one or more of radio frequency (RF) transceiver circuitry 772 and baseband processing circuitry 774. In some embodiments, radio frequency (RF) transceiver circuitry 772 and baseband processing circuitry 774 may be on separate chips (or sets of chips), boards, or units, such as radio units and digital units. In alternative embodiments, part or all of RF transceiver circuitry 772 and baseband processing circuitry 774 may be on the same chip or set of chips, boards, or units In certain embodiments, some or all of the functionality described herein as being provided by a network node, base station, eNB or other such network device may be performed by processing circuitry 770 executing instructions stored on device readable medium 780 or memory within processing circuitry 770. In alternative embodiments, some or all of the functionality may be provided by processing circuitry 770 without executing instructions stored on a separate or discrete device readable medium, such as in a hard-wired manner. In any of those embodiments, whether executing instructions stored on a device readable storage medium or not, processing circuitry 770 can be configured to perform the described functionality. The benefits provided by such functionality are not limited to processing circuitry 770 alone or to other components of network node 760, but are enjoyed by network node 760 as a whole, and/or by end users and the wireless network generally.

Device readable medium 780 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 770. Device readable medium 780 may store any suitable instructions, data or information, including a computer program, software, an application including one or more of logic, rules, code, tables, etc. and/or other instructions capable of being executed by processing circuitry 770 and, utilized by network node 760. Device readable medium 780 may be used to store any calculations made by processing circuitry 770 and/or any data received via interface 790. In some embodiments, processing circuitry 770 and device readable medium 780 may be considered to be integrated.

Interface 790 is used in the wired or wireless communication of signalling and/or data between network node 760, network 706, and/or WDs 710. As illustrated, interface 790 comprises port(s)/terminal(s) 794 to send and receive data, for example to and from network 706 over a wired connection. Interface 790 also includes radio front end circuitry 792 that may be coupled to, or in certain embodiments a part of, antenna 762. Radio front end circuitry 792 comprises filters 798 and amplifiers 796. Radio front end circuitry 792 may be connected to antenna 762 and processing circuitry 770. Radio front end circuitry may be configured to condition signals communicated between antenna 762 and processing circuitry 770. Radio front end circuitry 792 may receive digital data that is to be sent out to other network nodes or WDs via a wireless connection. Radio front end circuitry 792 may convert the digital data into a radio signal having the appropriate channel and bandwidth parameters using a combination of filters 798 and/or amplifiers 796. The radio signal may then be transmitted via antenna 762. Similarly, when receiving data, antenna 762 may collect radio signals which are then converted into digital data by radio front end circuitry 792. The digital data may be passed to processing circuitry 770. In other embodiments, the interface may comprise different components and/or different combinations of components.

In certain alternative embodiments, network node 760 may not include separate radio front end circuitry 792, instead, processing circuitry 770 may comprise radio front end circuitry and may be connected to antenna 762 without separate radio front end circuitry 792. Similarly, in some embodiments, all or some of RF transceiver circuitry 772 may be considered a part of interface 790. In still other embodiments, interface 790 may include one or more ports or terminals 794, radio front end circuitry 792, and RF transceiver circuitry 772, as part of a radio unit (not shown), and interface 790 may communicate with baseband processing circuitry 774, which is part of a digital unit (not shown).

Antenna 762 may include one or more antennas, or antenna arrays, configured to send and/or receive wireless signals. Antenna 762 may be coupled to radio front end circuitry 790 and may be any type of antenna capable of transmitting and receiving data and/or signals wirelessly. In some embodiments, antenna 762 may comprise one or more omni-directional, sector or panel antennas operable to transmit/receive radio signals between, for example, 2 GHz and 66 GHZ. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 762 may be separate from network node 760 and may be connectable to network node 760 through an interface or port.

Antenna 762, interface 790, and/or processing circuitry 770 may be configured to perform any receiving operations and/or certain obtaining operations described herein as being performed by a network node. Any information, data and/or signals may be received from a wireless device, another network node and/or any other network equipment. Similarly, antenna 762, interface 790, and/or processing circuitry 770 may be configured to perform any transmitting operations described herein as being performed by a network node. Any information, data and/or signals may be transmitted to a wireless device, another network node and/or any other network equipment.

Power circuitry 787 may comprise, or be coupled to, power management circuitry and is configured to supply the components of network node 760 with power for performing the functionality described herein. Power circuitry 787 may receive power from power source 786. Power source 786 and/or power circuitry 787 may be configured to provide power to the various components of network node 760 in a form suitable for the respective components (e.g., at a voltage and current level needed for each respective component). Power source 786 may either be included in, or external to, power circuitry 787 and/or network node 760. For example, network node 760 may be connectable to an external power source (e.g., an electricity outlet) via an input circuitry or interface such as an electrical cable, whereby the external power source supplies power to power circuitry 787. As a further example, power source 786 may comprise a source of power in the form of a battery or battery pack which is connected to, or integrated in, power circuitry 787. The battery may provide backup power should the external power source fail. Other types of power sources, such as photovoltaic devices, may also be used.

Alternative embodiments of network node 760 may include additional components beyond those shown in FIG. 7 that may be responsible for providing certain aspects of the network node's functionality, including any of the functionality described herein and/or any functionality necessary to support the subject matter described herein. For example, network node 760 may include user interface equipment to allow input of information into network node 760 and to allow output of information from network node 760. This may allow a user to perform diagnostic, maintenance, repair, and other administrative functions for network node 760.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc., A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 710 includes antenna 711, interface 714, processing circuitry 720, device readable medium 730, user interface equipment 732, auxiliary equipment 734, power source 736 and power circuitry 737. WD 710 may include multiple sets of one or more of the illustrated components for different wireless technologies supported by WD 710, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 710.

Antenna 711 may include one or more antennas or antenna arrays, configured to send and/or receive wireless signals, and is connected to interface 714. In certain alternative embodiments, antenna 711 may be separate from WD 710 and be connectable to WD 710 through an interface or port. Antenna 711, interface 714, and/or processing circuitry 720 may be configured to perform any receiving or transmitting operations described herein as being performed by a WD. Any information, data and/or signals may be received from a network node and/or another WD. In some embodiments, radio front end circuitry and/or antenna 711 may be considered an interface.

As illustrated, interface 714 comprises radio front end circuitry 712 and antenna 711. Radio front end circuitry 712 comprise one or more filters 718 and amplifiers 716. Radio front end circuitry 714 is connected to antenna 711 and processing circuitry 720, and is configured to condition signals communicated between antenna 711 and processing circuitry 720. Radio front end circuitry 712 may be coupled to or a part of antenna 711. In some embodiments, WD 710 may not include separate radio front end circuitry 712; rather, processing circuitry 720 may comprise radio front end circuitry and may be connected to antenna 711. Similarly, in some embodiments, some or all of RF transceiver circuitry 722 may be considered a part of interface 714. Radio front end circuitry 712 may receive digital data that is to be sent out to other network nodes or WDs via a wireless connection. Radio front end circuitry 712 may convert the digital data into a radio signal having the appropriate channel and bandwidth parameters using a combination of filters 718 and/or amplifiers 716. The radio signal may then be transmitted via antenna 711. Similarly, when receiving data, antenna 711 may collect radio signals which are then converted into digital data by radio front end circuitry 712. The digital data may be passed to processing circuitry 720. In other embodiments, the interface may comprise different components and/or different combinations of components.

Processing circuitry 720 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 710 components, such as device readable medium 730, WD 710 functionality. Such functionality may include providing any of the various wireless features or benefits discussed herein. For example, processing circuitry 720 may execute instructions stored in device readable medium 730 or in memory within processing circuitry 720 to provide the functionality disclosed herein.

As illustrated, processing circuitry 720 includes one or more of RF transceiver circuitry 722, baseband processing circuitry 724, and application processing circuitry 726. In other embodiments, the processing circuitry may comprise different components and/or different combinations of components. In certain embodiments processing circuitry 720 of WD 710 may comprise a SOC. In some embodiments, RF transceiver circuitry 722, baseband processing circuitry 724, and application processing circuitry 726 may be on separate chips or sets of chips. In alternative embodiments, part or all of baseband processing circuitry 724 and application processing circuitry 726 may be combined into one chip or set of chips, and RF transceiver circuitry 722 may be on a separate chip or set of chips. In still alternative embodiments, part or all of RF transceiver circuitry 722 and baseband processing circuitry 724 may be on the same chip or set of chips, and application processing circuitry 726 may be on a separate chip or set of chips. In yet other alternative embodiments, part or all of RF transceiver circuitry 722, baseband processing circuitry 724, and application processing circuitry 726 may be combined in the same chip or set of chips. In some embodiments, RF transceiver circuitry 722 may be a part of interface 714. RF transceiver circuitry 722 may condition RF signals for processing circuitry 720.

In certain embodiments, some or all of the functionality described herein as being performed by a WD may be provided by processing circuitry 720 executing instructions stored on device readable medium 730, which in certain embodiments may be a computer-readable storage medium. In alternative embodiments, some or all of the functionality may be provided by processing circuitry 720 without executing instructions stored on a separate or discrete device readable storage medium, such as in a hard-wired manner. In any of those particular embodiments, whether executing instructions stored on a device readable storage medium or not, processing circuitry 720 can be configured to perform the described functionality. The benefits provided by such functionality are not limited to processing circuitry 720 alone or to other components of WD 710, but are enjoyed by WD 710 as a whole, and/or by end users and the wireless network generally.

Processing circuitry 720 may be configured to perform any determining, calculating, or similar operations (e.g., certain obtaining operations) described herein as being performed by a WD. These operations, as performed by processing circuitry 720, may include processing information obtained by processing circuitry 720 by, for example, converting the obtained information into other information, comparing the obtained information or converted information to information stored by WD 710, and/or performing one or more operations based on the obtained information or converted information, and as a result of said processing making a determination.

Device readable medium 730 may be operable to store a computer program, software, an application including one or more of logic, rules, code, tables, etc, and/or other instructions capable of being executed by processing circuitry 720. Device readable medium 730 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 720. In some embodiments, processing circuitry 720 and device readable medium 730 may be considered to be integrated.

User interface equipment 732 may provide components that allow for a human user to interact with WD 710. Such interaction may be of many forms, such as visual, audial, tactile, etc. User interface equipment 732 may be operable to produce output to the user and to allow the user to provide input to WD 710. The type of interaction may vary depending on the type of user interface equipment 732 installed in WD 710. For example, if WD 710 is a smart phone, the interaction may be via a touch screen; if WD 710 is a smart meter, the interaction may be through a screen that provides usage (e.g., the number of gallons used) or a speaker that provides an audible alert (e.g., if smoke is detected). User interface equipment 732 may include input interfaces, devices and circuits, and output interfaces, devices and circuits. User interface equipment 732 is configured to allow input of information into WD 710, and is connected to processing circuitry 720 to allow processing circuitry 720 to process the input information. User interface equipment 732 may include, for example, a microphone, a proximity or other sensor, keys/buttons, a touch display, one or more cameras, a USB port, or other input circuitry. User interface equipment 732 is also configured to allow output of information from WD 710, and to allow processing circuitry 720 to output information from WD 710. User interface equipment 732 may include, for example, a speaker, a display, vibrating circuitry, a USB port, a headphone interface, or other output circuitry. Using one or more input and output interfaces, devices, and circuits, of user interface equipment 732, WD 710 may communicate with end users and/or the wireless network, and allow them to benefit from the functionality described herein.

Auxiliary equipment 734 is operable to provide more specific functionality which may not be generally performed by WDs. This may comprise specialized sensors for doing measurements for various purposes, interfaces for additional types of communication such as wired communications etc. The inclusion and type of components of auxiliary equipment 734 may vary depending on the embodiment and/or scenario.

Power source 736 may, in some embodiments, be in the form of a battery or battery pack. Other types of power sources, such as an external power source (e.g., an electricity outlet), photovoltaic devices or power cells, may also be used. WD 710 may further comprise power circuitry 737 for delivering power from power source 736 to the various parts of WD 710 which need power from power source 736 to carry out any functionality described or indicated herein. Power circuitry 737 may in certain embodiments comprise power management circuitry. Power circuitry 737 may additionally or alternatively be operable to receive power from an external power source; in which case WD 710 may be connectable to the external power source (such as an electricity outlet) via input circuitry or an interface such as an electrical power cable. Power circuitry 737 may also in certain embodiments be operable to deliver power from an external power source to power source 736. This may be, for example, for the charging of power source 736. Power circuitry 737 may perform any formatting, converting, or other modification to the power from power source 736 to make the power suitable for the respective components of WD 710 to which power is supplied.

Figure 8:
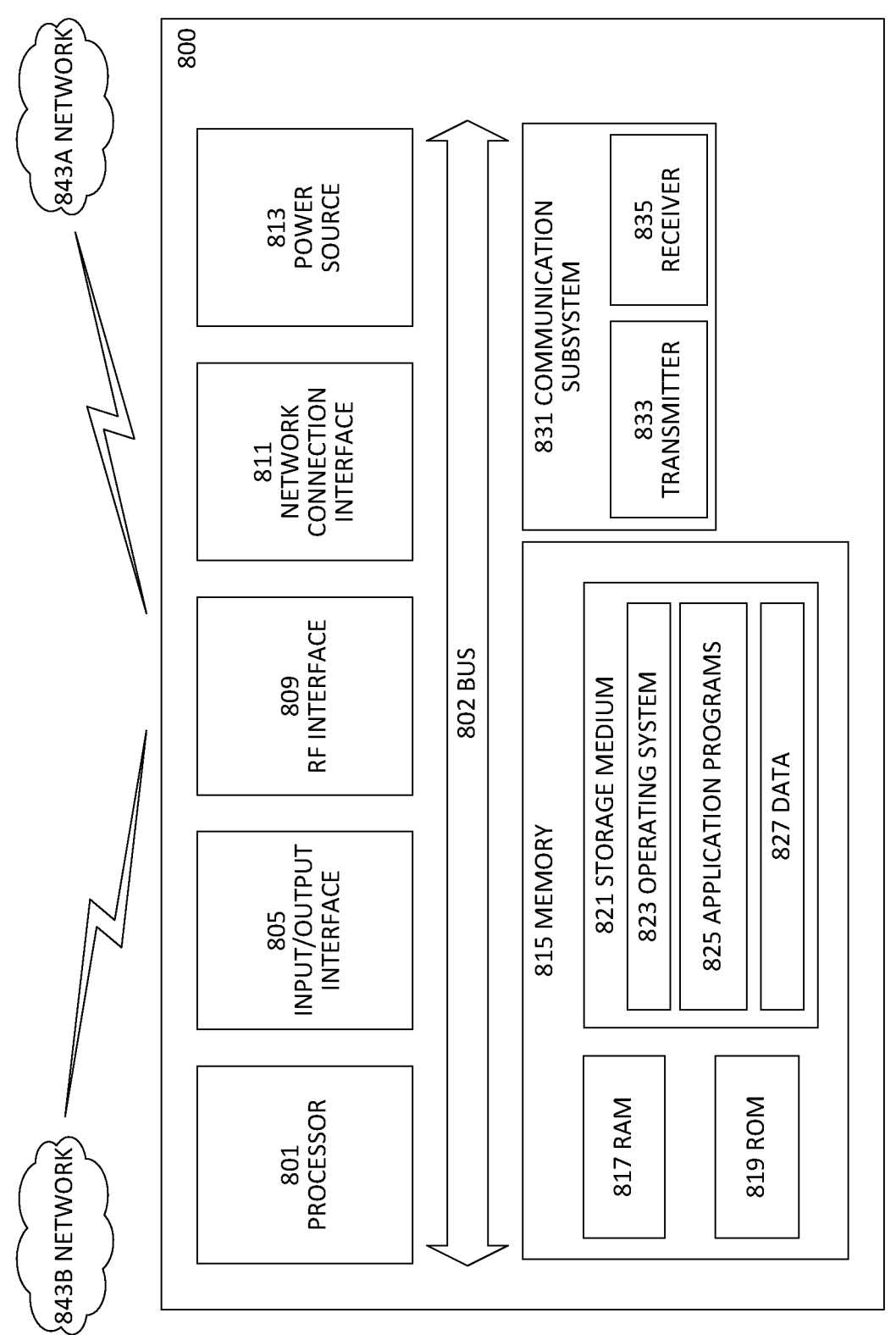
FIG. 8 is a block diagram of a user equipment according to some embodiments.

FIG. 8 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 8200 may be any UE identified by the $3^{rd}$ Generation Partnership Project (3GPP), including a NB-IoT UE, a machine type communication (MTC) UE, and/or an enhanced MTC (eMTC) UE. UE 800, as illustrated in FIG. 8, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 8 is a UE, the components discussed herein are equally applicable to a WD, and vice-versa.

In FIG. 8, UE 800 includes processing circuitry 801 that is operatively coupled to input/output interface 805, radio frequency (RF) interface 809, network connection interface 811, memory 815 including random access memory (RAM) 817, read-only memory (ROM) 819, and storage medium 821 or the like, communication subsystem 831, power source 833, and/or any other component, or any combination thereof. Storage medium 821 includes operating system 823, application program 825, and data 827. In other embodiments, storage medium 821 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 801 may be configured to process computer instructions and data. Processing circuitry 801 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 801 may include two central processing units (CPUs). Data may be information in a form suitable for use by a computer.

In the depicted embodiment, input/output interface 805 may be configured to provide a communication interface to an input device, output device, or input and output device. UE 800 may be configured to use an output device via input/output interface 805. An output device may use the same type of interface port as an input device. For example, a USB port may be used to provide input to and output from UE 800. The output device may be a speaker, a sound card, a video card, a display, a monitor, a printer, an actuator, an emitter, a smartcard, another output device, or any combination thereof. UE 800 may be configured to use an input device via input/output interface 805 to allow a user to capture information into UE 800. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 809 may be configured to provide a communication interface to RF components such as a transmitter, a receiver, and an antenna. Network connection interface 811 may be configured to provide a communication interface to network 843a. Network 843a may encompass wired and/or wireless networks such as a local-area network (LAN), a wide-area network (WAN), a computer network, a wireless network, a telecommunications network, another like network or any combination thereof. For example, network 843a may comprise a Wi-Fi network. Network connection interface 811 may be configured to include a receiver and a transmitter interface used to communicate with one or more other devices over a communication network according to one or more communication protocols, such as Ethernet, TCP/IP, SONET, ATM, or the like. Network connection interface 811 may implement receiver and transmitter functionality appropriate to the communication network links (e.g., optical, electrical, and the like). The transmitter and receiver functions may share circuit components, software or firmware, or alternatively may be implemented separately.

RAM 817 may be configured to interface via bus 802 to processing circuitry 801 to provide storage or caching of data or computer instructions during the execution of software programs such as the operating system, application programs, and device drivers. ROM 819 may be configured to provide computer instructions or data to processing circuitry 801. For example, ROM 819 may be configured to store invariant low-level system code or data for basic system functions such as basic input and output (I/O), startup, or reception of keystrokes from a keyboard that are stored in a non-volatile memory. Storage medium 821 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 821 may be configured to include operating system 823, application program 825 such as a web browser application, a widget or gadget engine or another application, and data file 827. Storage medium 821 may store, for use by UE 800, any of a variety of various operating systems or combinations of operating systems.

Storage medium 821 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 821 may allow UE 800 to access computer-executable instructions, application programs or the like, stored on transitory or non-transitory memory media, to off-load data, or to upload data. An article of manufacture, such as one utilizing a communication system may be tangibly embodied in storage medium 821, which may comprise a device readable medium.

In FIG. 8, processing circuitry 801 may be configured to communicate with network 843b using communication subsystem 831. Network 843a and network 843b may be the same network or networks or different network or networks. Communication subsystem 831 may be configured to include one or more transceivers used to communicate with network 843b. For example, communication subsystem 831 may be configured to include one or more transceivers used to communicate with one or more remote transceivers of another device capable of wireless communication such as another WD, UE, or base station of a radio access network (RAN) according to one or more communication protocols, such as IEEE 802.8, CDMA, WCDMA, GSM, LTE, UTRAN, WiMax, or the like. Each transceiver may include transmitter 833 and/or receiver 835 to implement transmitter or receiver functionality, respectively, appropriate to the RAN links (e.g., frequency allocations and the like). Further, transmitter 833 and receiver 835 of each transceiver may share circuit components, software or firmware, or alternatively may be implemented separately.

In the illustrated embodiment, the communication functions of communication subsystem 831 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 831 may include cellular communication, Wi-Fi communication, Bluetooth communication, and GPS communication. Network 843b may encompass wired and/or wireless networks such as a local-area network (LAN), a wide-area network (WAN), a computer network, a wireless network, a telecommunications network, another like network or any combination thereof. For example, network 843b may be a cellular network, a Wi-Fi network, and/or a near-field network. Power source 813 may be configured to provide alternating current (AC) or direct current (DC) power to components of UE 800.

The features, benefits and/or functions described herein may be implemented in one of the components of UE 800 or partitioned across multiple components of UE 800. Further, the features, benefits, and/or functions described herein may be implemented in any combination of hardware, software or firmware. In one example, communication subsystem 831 may be configured to include any of the components described herein. Further, processing circuitry 801 may be configured to communicate with any of such components over bus 802. In another example, any of such components may be represented by program instructions stored in memory that when executed by processing circuitry 801 perform the corresponding functions described herein. In another example, the functionality of any of such components may be partitioned between processing circuitry 801 and communication subsystem 831. In another example, the non-computationally intensive functions of any of such components may be implemented in software or firmware and the computationally intensive functions may be implemented in hardware.

Figure 9:
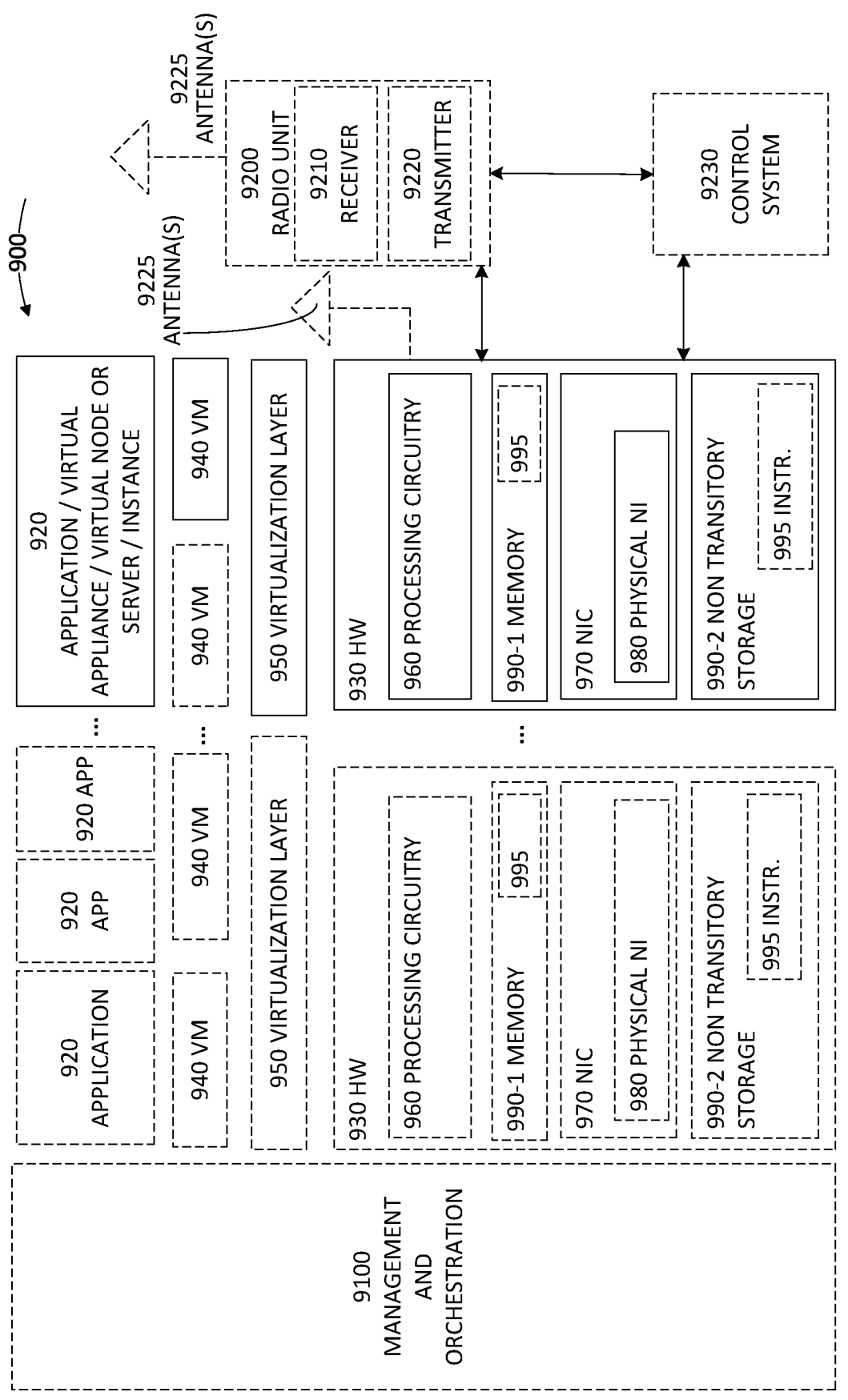
FIG. 9 is a block diagram of a virtualization environment according to some embodiments.

FIG. 9 is a schematic block diagram illustrating a virtualization environment 900 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 900 hosted by one or more of hardware nodes 930. Further, in embodiments in which the virtual node is not a radio access node or does not require radio connectivity (e.g., a core network node), then the network node may be entirely virtualized.

The functions may be implemented by one or more applications 920 (which may alternatively be called software instances, virtual appliances, network functions, virtual nodes, virtual network functions, etc.) operative to implement some of the features, functions, and/or benefits of some of the embodiments disclosed herein. Applications 920 are run in virtualization environment 900 which provides hardware 930 comprising processing circuitry 960 and memory 990. Memory 990 contains instructions 995 executable by processing circuitry 960 whereby application 920 is operative to provide one or more of the features, benefits, and/or functions disclosed herein.

Virtualization environment 900, comprises general-purpose or special-purpose network hardware devices 930 comprising a set of one or more processors or processing circuitry 960, which may be commercial off-the-shelf (COTS) processors, dedicated Application Specific Integrated Circuits (ASICs), or any other type of processing circuitry including digital or analog hardware components or special purpose processors. Each hardware device may comprise memory 990-1 which may be non-persistent memory for temporarily storing instructions 995 or software executed by processing circuitry 960. Each hardware device may comprise one or more network interface controllers (NICs) 970, also known as network interface cards, which include physical network interface 980. Each hardware device may also include non-transitory, persistent, machine-readable storage media 990-2 having stored therein software 995 and/or instructions executable by processing circuitry 960. Software 995 may include any type of software including software for instantiating one or more virtualization layers 950 (also referred to as hypervisors), software to execute virtual machines 940 as well as software allowing it to execute functions, features and/or benefits described in relation with some embodiments described herein.

Virtual machines 940, comprise virtual processing, virtual memory, virtual networking or interface and virtual storage, and may be run by a corresponding virtualization layer 950 or hypervisor. Different embodiments of the instance of virtual appliance 920 may be implemented on one or more of virtual machines 940, and the implementations may be made in different ways.

During operation, processing circuitry 960 executes software 995 to instantiate the hypervisor or virtualization layer 950, which may sometimes be referred to as a virtual machine monitor (VMM). Virtualization layer 950 may present a virtual operating platform that appears like networking hardware to virtual machine 940.

As shown in FIG. 9, hardware 930 may be a standalone network node with generic or specific components. Hardware 930 may comprise antenna 9225 and may implement some functions via virtualization. Alternatively, hardware 930 may be part of a larger cluster of hardware (e.g. such as in a data center or customer premise equipment (CPE)) where many hardware nodes work together and are managed via management and orchestration (MANO) 9100, which, among others, oversees lifecycle management of applications 920.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 940 may be a software implementation of a physical machine that runs programs as if they were executing on a physical, non-virtualized machine. Each of virtual machines 940, and that part of hardware 930 that executes that virtual machine, be it hardware dedicated to that virtual machine and/or hardware shared by that virtual machine with others of the virtual machines 940, forms a separate virtual network elements (VNE).

Still in the context of NFV, Virtual Network Function (VNF) is responsible for handling specific network functions that run in one or more virtual machines 940 on top of hardware networking infrastructure 930 and corresponds to application 920 in FIG. 9.

In some embodiments, one or more radio units 9200 that each include one or more transmitters 9220 and one or more receivers 9210 may be coupled to one or more antennas 9225. Radio units 9200 may communicate directly with hardware nodes 930 via one or more appropriate network interfaces and may be used in combination with the virtual components to provide a virtual node with radio capabilities, such as a radio access node or a base station.

In some embodiments, some signalling can be effected with the use of control system 9230 which may alternatively be used for communication between the hardware nodes 930 and radio units 9200.

Figure 10:
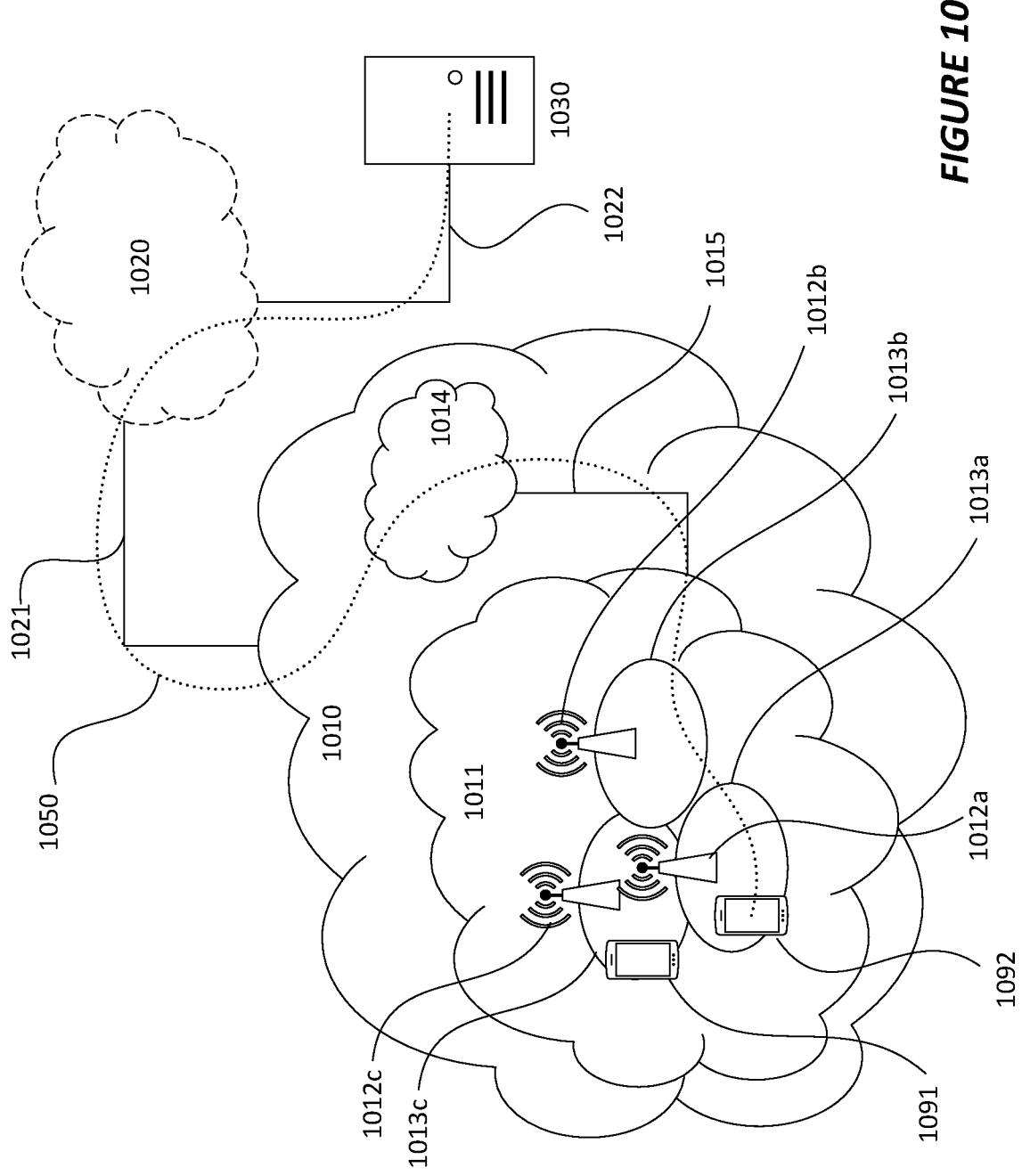
FIG. 10 is a block diagram of a communication network with a host computer according to some embodiments.

FIG. 10 illustrates a telecommunication network connected via an intermediate network to a host computer in accordance with some embodiments. In particular, with reference to FIG. 10, in accordance with an embodiment, a communication system includes telecommunication network 1010, such as a 3GPP-type cellular network, which comprises access network 1011, such as a radio access network, and core network 1014. Access network 1011 comprises a plurality of base stations 1012a, 1012b, 1012c, such as NBs, eNBs, gNBs or other types of wireless access points, each defining a corresponding coverage area 1013a, 1013b, 1013c. Each base station 1012a, 1012b, 1012c is connectable to core network 1014 over a wired or wireless connection 1015. A first UE 1091 located in coverage area 1013c is configured to wirelessly connect to, or be paged by, the corresponding base station 1012c. A second UE 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider, or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private or hosted network; intermediate network 1020, if any, may be a backbone network or the Internet; in particular, intermediate network 1020 may comprise two or more sub-networks (not shown).

The communication system of FIG. 10 as a whole enables connectivity between the connected UEs 1091, 1092 and host computer 1030. The connectivity may be described as an over-the-top (OTT) connection 1050. Host computer 1030 and the connected UEs 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink and downlink communications. For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 1091 towards the host computer 1030.

Figure 11:
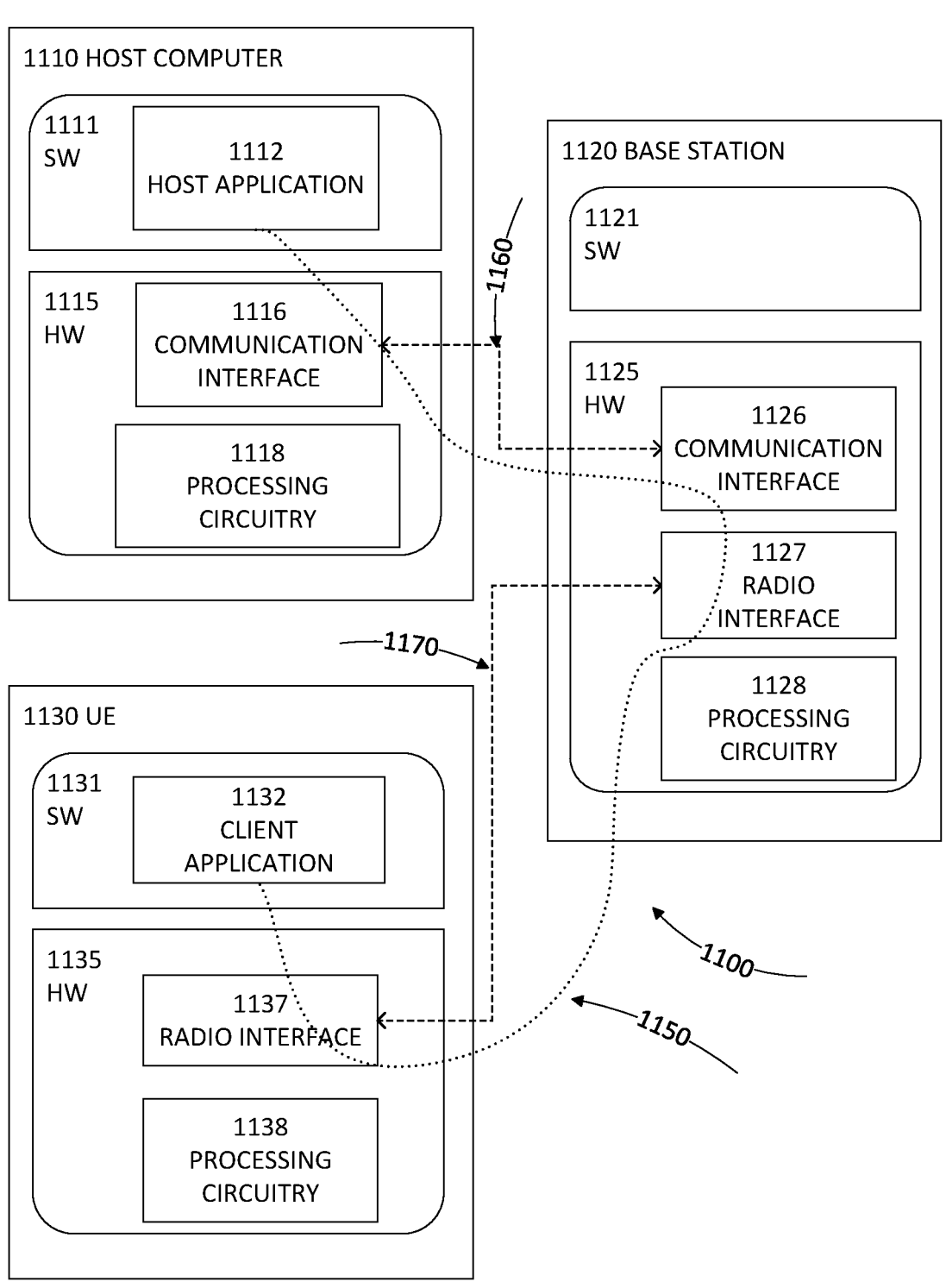
FIG. 11 is a block diagram of a host computer according to some embodiments.

Example implementations, in accordance with an embodiment, of the UE, base station and host computer discussed in the preceding paragraphs will now be described with reference to FIG. 11. FIG. 11 illustrates host computer communicating via a base station with a user equipment over a partially wireless connection in accordance with some embodiments In communication system 1100, host computer 1110 comprises hardware 1115 including communication interface 1116 configured to set up and maintain a wired or wireless connection with an interface of a different communication device of communication system 1100. Host computer 1110 further comprises processing circuitry 1118, which may have storage and/or processing capabilities. In particular, processing circuitry 1118 may comprise one or more programmable processors, application-specific integrated circuits, field programmable gate arrays or combinations of these (not shown) adapted to execute instructions. Host computer 1110 further comprises software 1111, which is stored in or accessible by host computer 1110 and executable by processing circuitry 1118. Software 1111 includes host application 1112. Host application 1112 may be operable to provide a service to a remote user, such as UE 1130 connecting via OTT connection 1150 terminating at UE 1130 and host computer 1110. In providing the service to the remote user, host application 1112 may provide user data which is transmitted using OTT connection 1150.

Communication system 1100 further includes base station 1120 provided in a telecommunication system and comprising hardware 1125 enabling it to communicate with host computer 1110 and with UE 1130. Hardware 1125 may include communication interface 1126 for setting up and maintaining a wired or wireless connection with an interface of a different communication device of communication system 1100, as well as radio interface 1127 for setting up and maintaining at least wireless connection 1170 with UE 1130 located in a coverage area (not shown in FIG. 11) served by base station 1120. Communication interface 1126 may be configured to facilitate connection 1160 to host computer 1110. Connection 1160 may be direct or it may pass through a core network (not shown in FIG. 11) of the telecommunication system and/or through one or more intermediate networks outside the telecommunication system. In the embodiment shown, hardware 1125 of base station 1120 further includes processing circuitry 1128, which may comprise one or more programmable processors, application-specific integrated circuits, field programmable gate arrays or combinations of these (not shown) adapted to execute instructions. Base station 1120 further has software 1121 stored internally or accessible via an external connection.

Communication system 1100 further includes UE 1130 already referred to. Its hardware 1135 may include radio interface 1137 configured to set up and maintain wireless connection 1170 with a base station serving a coverage area in which UE 1130 is currently located. Hardware 1135 of UE 1130 further includes processing circuitry 1138, which may comprise one or more programmable processors, application-specific integrated circuits, field programmable gate arrays or combinations of these (not shown) adapted to execute instructions. UE 1130 further comprises software 1131, which is stored in or accessible by UE 1130 and executable by processing circuitry 1138. Software 1131 includes client application 1132. Client application 1132 may be operable to provide a service to a human or non-human user via UE 1130, with the support of host computer 1110. In host computer 1110, an executing host application 1112 may communicate with the executing client application 1132 via OTT connection 1150 terminating at UE 1130 and host computer 1110. In providing the service to the user, client application 1132 may receive request data from host application 1112 and provide user data in response to the request data. OTT connection 1150 may transfer both the request data and the user data. Client application 1132 may interact with the user to generate the user data that it provides.

It is noted that host computer 1110, base station 1120 and UE 1130 illustrated in FIG. 11 may be similar or identical to host computer 1030, one of base stations 1012a, 1012b, 1012c and one of UEs 1091, 1092 of FIG. 10, respectively. This is to say, the inner workings of these entities may be as shown in FIG. 11 and independently, the surrounding network topology may be that of FIG. 10.

In FIG. 11, OTT connection 1150 has been drawn abstractly to illustrate the communication between host computer 1110 and UE 1130 via base station 1120, without explicit reference to any intermediary devices and the precise routing of messages via these devices. Network infrastructure may determine the routing, which it may be configured to hide from UE 1130 or from the service provider operating host computer 1110, or both. While OTT connection 1150 is active, the network infrastructure may further take decisions by which it dynamically changes the routing (e.g., on the basis of load balancing consideration or reconfiguration of the network).

Wireless connection 1170 between UE 1130 and base station 1120 is in accordance with the teachings of the embodiments described throughout this disclosure. One or more of the various embodiments improve the performance of OTT services provided to UE 1130 using OTT connection 1150, in which wireless connection 1170 forms the last segment.

A measurement procedure may be provided for the purpose of monitoring data rate, latency and other factors on which the one or more embodiments improve. There may further be an optional network functionality for reconfiguring OTT connection 1150 between host computer 1110 and UE 1130, in response to variations in the measurement results. The measurement procedure and/or the network functionality for reconfiguring OTT connection 1150 may be implemented in software 1111 and hardware 1115 of host computer 1110 or in software 1131 and hardware 1135 of UE 1130, or both. In embodiments, sensors (not shown) may be deployed in or in association with communication devices through which OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of OTT connection 1150 may include message format, retransmission settings, preferred routing etc.; the reconfiguring need not affect base station 1120, and it may be unknown or imperceptible to base station 1120. Such procedures and functionalities may be known and practiced in the art. In certain embodiments, measurements may involve proprietary UE signaling facilitating host computer 1110's measurements of throughput, propagation times, latency and the like. The measurements may be implemented in that software 1111 and 1131 causes messages to be transmitted, in particular empty or 'dummy' messages, using OTT connection 1150 while it monitors propagation times, errors etc.

Figure 12:
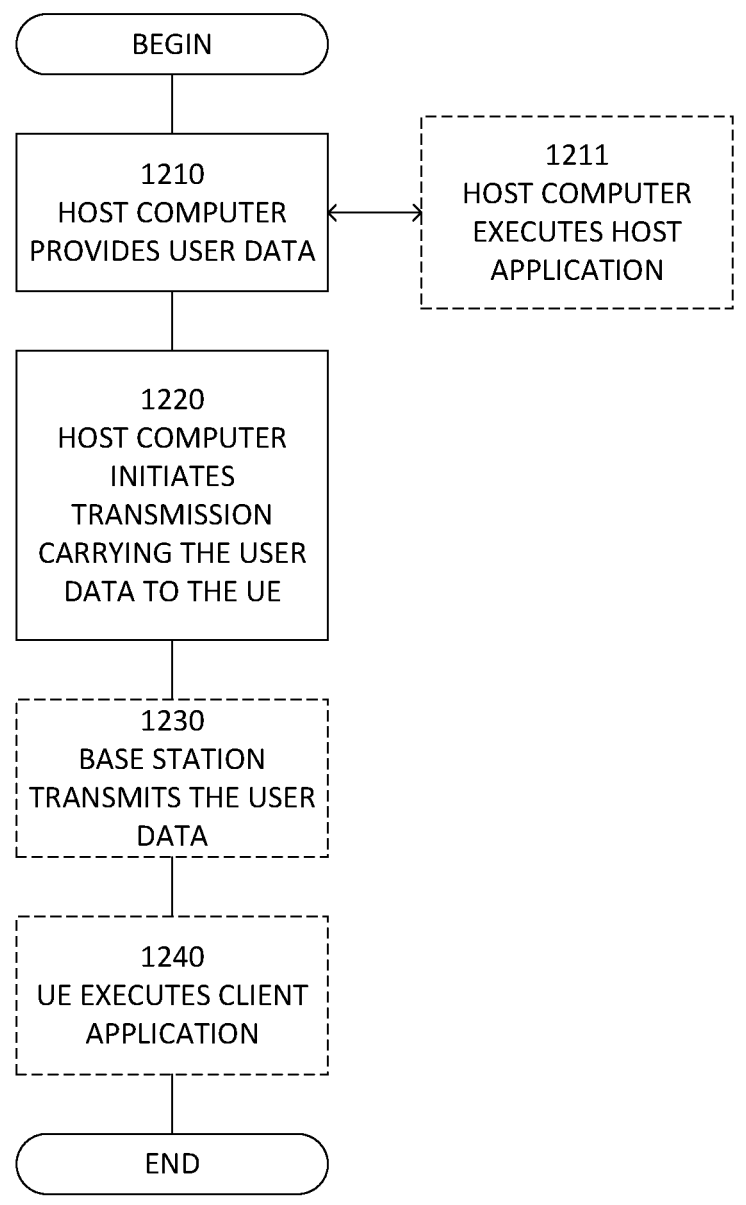
FIG. 12 is a flowchart illustrating a method implemented in a communication system, in accordance with one embodiment.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 1210, the host computer provides user data. In substep 1211 (which may be optional) of step 1210, the host computer provides the user data by executing a host application. In step 1220, the host computer initiates a transmission carrying the user data to the UE. In step 1230 (which may be optional), the base station transmits to the UE the user data which was carried in the transmission that the host computer initiated, in accordance with the teachings of the embodiments described throughout this disclosure. In step 1240 (which may also be optional), the UE executes a client application associated with the host application executed by the host computer.

Figure 13:
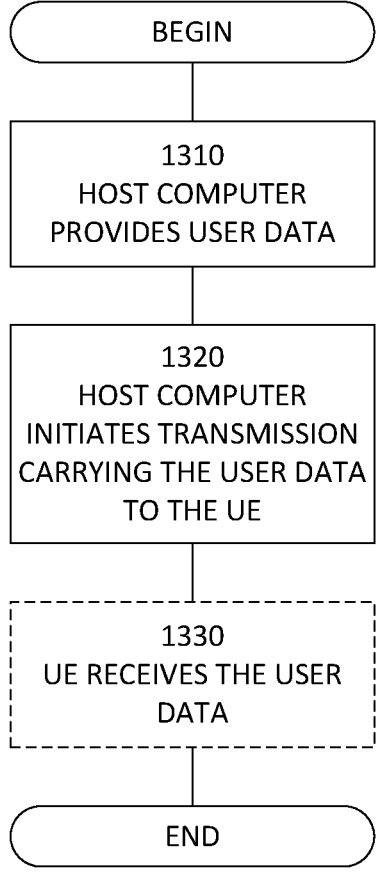
FIG. 13 is a flowchart illustrating a method implemented in a communication system, in accordance with one embodiment.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 1310 of the method, the host computer provides user data. In an optional substep (not shown) the host computer provides the user data by executing a host application. In step 1320, the host computer initiates a transmission carrying the user data to the UE. The transmission may pass via the base station, in accordance with the teachings of the embodiments described throughout this disclosure. In step 1330 (which may be optional), the UE receives the user data carried in the transmission.

Figure 14:
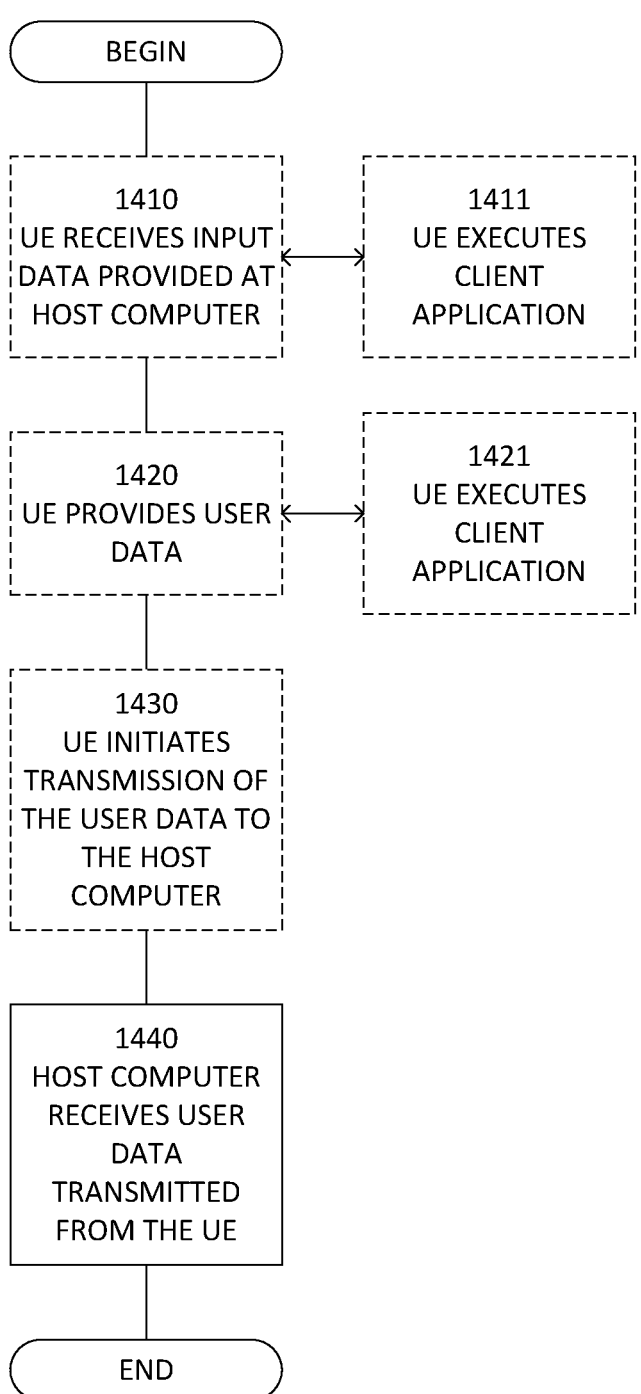
FIG. 14 is a flowchart illustrating a method implemented in a communication system, in accordance with one embodiment.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 1410 (which may be optional), the UE receives input data provided by the host computer. Additionally or alternatively, in step 1420, the UE provides user data. In substep 1421 (which may be optional) of step 1420, the UE provides the user data by executing a client application. In substep 1411 (which may be optional) of step 1410, the UE executes a client application which provides the user data in reaction to the received input data provided by the host computer. In providing the user data, the executed client application may further consider user input received from the user. Regardless of the specific manner in which the user data was provided, the UE initiates, in substep 1430 (which may be optional), transmission of the user data to the host computer. In step 1440 of the method, the host computer receives the user data transmitted from the UE, in accordance with the teachings of the embodiments described throughout this disclosure.

Figure 15:
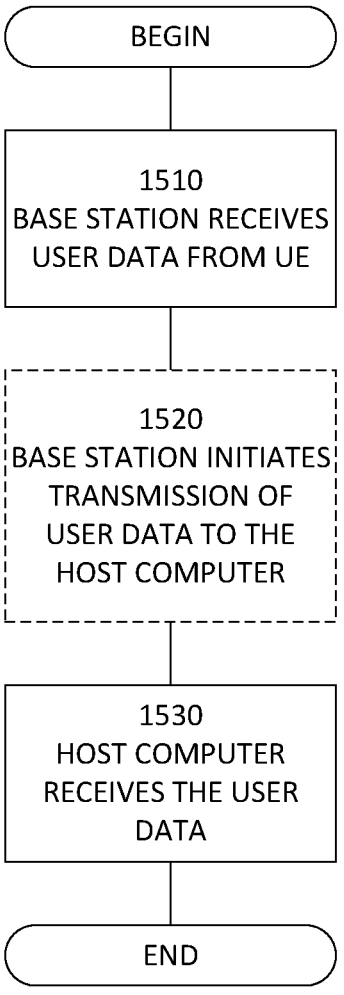
FIG. 15 is a flowchart illustrating a method implemented in a communication system, in accordance with one embodiment.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 1510 (which may be optional), in accordance with the teachings of the embodiments described throughout this disclosure, the base station receives user data from the UE. In step 1520 (which may be optional), the base station initiates transmission of the received user data to the host computer. In step 1530 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The term "A and/or B" as used herein covers embodiments having A alone, B alone, or both A and B together. The term "A and/or B" may therefore equivalently mean "at least one of any one or more of A and B".

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Example embodiments of the techniques and apparatus described herein include, but are not limited to, the following enumerated examples:

Group A Embodiments

A1. A method performed by a network node, the method comprising:

obtaining, for each of one or more wireless devices, radio performance information indicating measured radio performances that multiple cells respectively provided to the wireless device while the wireless device was simultaneously connected to the multiple cells in multi-connectivity operation under certain conditions;

based on the obtained radio performance information, building a prediction model which models radio performance that a cell will provide under one or more conditions; and making, or configuring another network node to make, decisions on mobility, scheduling, and/or radio configuration of wireless devices based on the prediction model.

A2. The method of embodiment A1, wherein the radio performance information obtained for a wireless device indicates measured radio performances that multiple cells respectively provided to the wireless device while the wireless device was simultaneously connected to the multiple cells in multi-connectivity operation during certain times and/or at certain locations, and wherein the prediction model models radio performance that a cell will provide to a wireless device during one or more times and/or at one or more locations.

A3. The method of any of embodiments A1-A2, wherein the radio performance information obtained for a wireless device indicates measured radio performances that multiple cells respectively provided to the wireless device while the wireless device was simultaneously connected to the multiple cells in multi-connectivity operation under a certain cell load level, and wherein the prediction model models radio performance that a cell will provide to a wireless device under one or more cell load levels.

A4. The method of any of embodiments A1-A3, wherein the radio performance information obtained for a wireless device indicates measured radio performances that multiple cells respectively provided to the wireless device while the wireless device was simultaneously connected to the multiple cells in multi-connectivity operation using a certain radio configuration, and wherein the prediction model models radio performance that a cell will provide to a wireless device under one or more radio configurations.

A5. The method of embodiment A4, wherein the certain radio configuration is a multi-connectivity configuration, and wherein the one or more radio configurations are one or more multi-connectivity configurations.

A6. The method of any of embodiments A1-A5, wherein the radio performance information obtained for a wireless device indicates measured radio performances that multiple cells respectively provided to the wireless device while the wireless device was simultaneously connected to the multiple cells in multi-connectivity operation with certain device capabilities, and wherein the prediction model models radio performance that a cell will provide to a wireless device with one or more device capabilities.

A7. The method of any of embodiments A1-A6, comprising making, or configuring another network node to make, decisions on mobility of wireless devices based on the prediction model.

A8. The method of embodiment A7, wherein said mobility comprises inter-frequency mobility or inter radio access technology mobility.

A9. The method of any of embodiments A7-A8, wherein said decisions on mobility include at least one of any one or more of:
  a decision on which cell is to be a target of a mobility procedure for a wireless device;
  a decision on which wireless device is to perform a mobility procedure; and
  a decision on where or when a wireless device is to perform a mobility procedure.

A10. The method of any of embodiments A7-A9, wherein making, or configuring another network node to make, decisions on mobility of wireless devices based on the prediction model comprises making, or configuring another network node to make, a decision that a wireless device is to perform a mobility procedure, based on the prediction model predicting a source cell will provide radio performance below a threshold at a certain time and/or at a certain location and/or predicting a target cell will provide radio performance above a threshold at the certain time and/or at the certain location.

A11. The method of any of embodiments A1-A10, comprising making, or configuring another network node to make, decisions on scheduling of wireless devices based on the prediction model.

A12. The method of embodiment A11, wherein said decisions on scheduling include at least one of any one or more of:
  a decision on which wireless device is to be prioritized for scheduling; and
  a decision on when a wireless device is to be scheduled.

A13. The method of any of embodiments A11-A12, wherein making, or configuring another network node to make, decisions on scheduling of wireless devices based on the prediction model comprises making, or configuring another network node to make, a decision that a wireless device is to be prioritized for scheduling before the wireless device arrives at a location where, according to the prediction model, one or more cells will provide radio performance below a threshold.

A14. The method of any of embodiments A1-A13, comprising making, or configuring another network node to make, decisions on radio configuration of wireless devices based on the prediction model.

A15. The method of embodiment A14, wherein said decision on radio configuration comprise at least one of any one or more of:
  a decision on whether or how to configure multi-connectivity operation of a wireless device;
  a decision on whether or how to configure carrier aggregation for a wireless device;
  a decision on whether or how to configure power boosting for a wireless device; and
  a decision on whether or how to configure transmission time interval, TTI, bundling for a wireless device.

A16. The method of any of embodiments A14-A15, wherein making, or configuring another network node to make, decisions on radio configuration of wireless devices based on the prediction model comprises making, or configuring another network node to make, a decision that a wireless device is to be configured with a certain radio configuration before the wireless device arrives at a location where, according to the prediction model, one or more cells will provide radio performance below a threshold.

A15. The method of any of embodiments A1-A16, wherein said obtaining comprises receiving at least some of the radio performance information from an information providing network node.

A16. The method of embodiment A15, wherein the information providing network node is configured as a secondary radio network node for multi-connectivity operation of a wireless device for which the information providing network node provides radio performance information.

A17. The method of embodiment A15, wherein the information providing network node is configured as a master radio network node for multi-connectivity operation of a wireless device for which the information providing network node provides radio performance information.

A18. The method of any of embodiments A15-A17, further comprising requesting the at least some of the radio performance information from the information providing network node, and wherein the at least some of the radio performance information is received from the information providing network node in response to said requesting.

A19. The method of any of embodiments A1-A18, wherein said obtaining comprises inferring or deducing at least some of the radio performance information.

A20. The method of embodiment A19, wherein inferring or deducing at least some of the radio performance information comprises inferring or deducing radio performance information that indicates radio performance of a cell, based on:
  a type or content of one or more messages received or intercepted from a radio network node providing the cell;
  a change in an extent to which the cell transmits or receives user plane traffic to a wireless device;
  whether the cell has transmitted or received user plane traffic to a wireless device within a certain time interval; and/or
  a change in an allocation of resources for transmitting or receiving user plane traffic to a wireless device in the cell.

A21. The method of any of embodiments A1-A20, further comprising analyzing and/or comparing radio performances provided by multiple cells to which a wireless device simultaneously connects in multi-connectivity operation as part of building the prediction model or making said decisions.

A22. The method of any of embodiments A1-A21, wherein the network node is a radio network node configured as a master radio network node for multi-connectivity operation of a wireless device.

A23. The method of any of embodiments A1-A21, wherein the network node is a radio network node configured as a secondary radio network node for multi-connectivity operation of a wireless device.

A24. The method of any of embodiments A1-A21, wherein the network node is an operation and maintenance node.

A25. The method of any of embodiments A1-A24, wherein said configuring another network node to make decisions on mobility, scheduling, and/or radio configuration of wireless devices based on the prediction model comprises transmitting the prediction model to said another network node.

A26. The method of any of embodiments A1-A25, wherein the prediction model is a machine learning model built using machine learning.

A27. The method of any of embodiments A1-A26, further comprising steering wireless devices towards a cell for which the prediction model has a prediction accuracy below a threshold.

A28. The method of any of embodiments A1-A27, wherein radio performance information that indicates measured radio performance that a cell provides to a wireless device comprises at least one of any one or more of:

measured reference signal strength or quality of the cell;

measured reference signal strength or quality of a neighbor cell of the cell;

measured radio link control throughput of the cell;

measured spectral efficiency of the cell;

measured packet error rate of the cell;

measured packet delay of the cell;

measured packet loss rate of the cell;

measured channel quality information of the cell; and measured block error rate of the cell.

Group B Embodiments

B1. A method performed by a network node, the method comprising:

obtaining a prediction model which models radio performance that a cell will provide under one or more conditions, wherein the prediction model is based on radio performance information for each of one or more wireless devices which indicates measured radio performances that multiple cells respectively provided to the wireless device while the wireless device was simultaneously connected to the multiple cells in multi-connectivity operation under certain conditions; and making, or configuring another network node to make, decisions on mobility, scheduling, and/or radio configuration of wireless devices based on the prediction model.

Group C Embodiments

C1-C8. Reserved.

C9. A network node configured to perform any of the steps of any of the Group A or B embodiments.

C10. A network node comprising processing circuitry configured to perform any of the steps of any of the Group A or B embodiments.

C11. A network node comprising:

communication circuitry; and processing circuitry configured to perform any of the steps of any of the Group A or B embodiments.

C12. A network node comprising:

processing circuitry configured to perform any of the steps of any of the Group A or B embodiments;

power supply circuitry configured to supply power to the network node.

C13. A network node comprising:

processing circuitry and memory, the memory containing instructions executable by the processing circuitry whereby the network node is configured to perform any of the steps of any of the Group A or B embodiments.

C14. The network node of any of embodiments C9-C13, wherein the network node is a base station.

C15. A computer program comprising instructions which, when executed by at least one processor of a network node, causes the network node to carry out the steps of any of the Group A embodiments.

C16. The computer program of embodiment C14, wherein the network node is a base station.

C17. A carrier containing the computer program of any of embodiments C15-C16, wherein the carrier is one of an electronic signal, optical signal, radio signal, or computer readable storage medium.

Group D Embodiments

D1. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group A or B embodiments.

D2. The communication system of the previous embodiment further including the base station.

D3. The communication system of the previous 2 embodiments, further including the UE, wherein the UE is configured to communicate with the base station.

D4. The communication system of the previous 3 embodiments, wherein:

the processing circuitry of the host computer is configured to execute a host application, thereby providing the user data; and the UE comprises processing circuitry configured to execute a client application associated with the host application.

D5. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps of any of the Group A or B embodiments.

D6. The method of the previous embodiment, further comprising, at the base station, transmitting the user data.

D7. The method of the previous 2 embodiments, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 embodiments.

D9-D22. Reserved.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group A or B embodiments.

D24. The communication system of the previous embodiment further including the base station.

D25. The communication system of the previous 2 embodiments, further including the UE, wherein the UE is configured to communicate with the base station.

D26. The communication system of the previous 3 embodiments, wherein:

the processing circuitry of the host computer is configured to execute a host application;

the UE is configured to execute a client application associated with the host application, thereby providing the user data to be received by the host computer.

What is claimed is:

1. A method performed by a network node, the method comprising:

obtaining, for each of one or more wireless devices, radio performance information indicating measured radio performances that multiple cells respectively provided to the wireless device while the wireless device was simultaneously connected to the multiple cells in multi-connectivity operation under certain conditions;

based on the obtained radio performance information, building a prediction model which models radio performance that a cell will provide under one or more conditions, wherein the prediction model models radio performance that a cell will provide in terms of one or more performance metrics predicted for the cell under the one or more conditions, wherein the one or more performance metrics include one or more absolute or relative measures of data throughput, radio link control throughput, signal strength, signal quality, spectral efficiency, packet error rate, packet delay, packet loss rate, channel quality information, and/or block error rate for the cell; and making, or configuring another network node to make, decisions on mobility, scheduling, and/or radio configuration of wireless devices based on comparing radio performances that different cells will provide under the same one or more conditions according to the prediction model, wherein the radio performances that the different cells will provide under the same one or more conditions are modeled based on radio performances that the different cells respectively provided in multi-connectivity operation.

2. The method of claim 1, wherein the one or more wireless devices are one or more first wireless devices, wherein, for each of the one or more first wireless devices, the radio performance information obtained for the first wireless device indicates measured radio performances that the multiple cells respectively provided to the first wireless device while the first wireless device was simultaneously connected to the multiple cells in the multi-connectivity operation during certain times and/or at certain locations, wherein the prediction model models radio performance that a cell will provide during one or more times and/or at one or more locations, and wherein making, or configuring another network node to make, the decisions comprises making, or configuring another network node to make, decisions on mobility, scheduling, and/or radio configuration of a second wireless device based on comparing radio performances that different cells will provide during a given time and/or at a given location as predicted according to the prediction model.

3. The method of claim 1, wherein the one or more wireless devices are one or more first wireless devices, wherein, for each of the one or more first wireless devices, the radio performance information obtained for the first wireless device indicates measured radio performances that the multiple cells respectively provided to the first wireless device while the first wireless device was simultaneously connected to the multiple cells in the multi-connectivity operation under a certain cell load level, wherein the prediction model models radio performance that a cell will provide under one or more cell load levels, and wherein making, or configuring another network node to make, the decisions comprises making, or configuring another network node to make, decisions on mobility, scheduling, and/or radio configuration of a second wireless device based on comparing radio performances that different cells will provide under a given cell load level as predicted according to the prediction model.

4. The method of claim 1, wherein the one or more wireless devices are one or more first wireless devices, wherein, for each of the one or more first wireless devices, the radio performance information obtained for the first wireless device indicates measured radio performances that the multiple cells respectively provided to the first wireless device while the first wireless device was simultaneously connected to the multiple cells in the multi-connectivity operation using a certain radio configuration, wherein the prediction model models radio performance that a cell will provide under one or more radio configurations, and wherein making, or configuring another network node to make, the decisions comprises making, or configuring another network node to make, decisions on mobility, scheduling, and/or radio configuration of a second wireless device based on comparing radio performances that different cells will provide using a given radio configuration as predicted according to the prediction model.

5. The method of claim 4, wherein the certain radio configuration is a multi-connectivity configuration, wherein the one or more radio configurations are one or more multi-connectivity configurations, and wherein the given radio configuration is a multi-connectivity configuration.

6. The method of claim 1, wherein the one or more wireless devices are one or more first wireless devices, wherein, for each of the one or more first wireless devices, the radio performance information obtained for the first wireless device indicates measured radio performances that the multiple cells respectively provided to the first wireless device while the first wireless device was simultaneously connected to the multiple cells in the multi-connectivity operation with certain device capabilities, wherein the prediction model models radio performance that a cell will provide to any wireless device with one or more device capabilities, and wherein making, or configuring another network node to make, the decisions comprises making, or configuring another network node to make, decisions on mobility, scheduling, and/or radio configuration of a second wireless device based on comparing radio performances that different cells will provide to the second wireless device with one or more given device capabilities as predicted according to the prediction model.

7. The method of claim 1, comprising making, or configuring another network node to make, decisions on mobility of wireless devices based on the prediction model, wherein said mobility comprises inter-frequency mobility or inter radio access technology mobility.

8. The method of claim 1, comprising making, or configuring another network node to make, decisions on mobility of wireless devices based on the prediction model, wherein said decisions on mobility include at least one of any one or more of:

a decision on which cell is to be a target of a mobility procedure for a second wireless device;

a decision on which wireless device is to perform a mobility procedure; and a decision on where or when a second wireless device is to perform a mobility procedure.

9. The method of claim 1, comprising making, or configuring another network node to make, decisions on scheduling of wireless devices based on the prediction model, wherein making, or configuring another network node to make, decisions on scheduling of wireless devices based on the prediction model comprises making, or configuring another network node to make, a decision that a second wireless device is to be prioritized for scheduling before the second wireless device arrives at a location where, according to the prediction model, one or more cells will provide radio performance below a threshold.

10. The method of claim 1, comprising making, or configuring another network node to make, decisions on radio configuration of wireless devices based on the prediction model, wherein said decision on radio configuration comprise at least one of any one or more of:

a decision on whether or how to configure the multi-connectivity operation of a second wireless device;

a decision on whether or how to configure carrier aggregation for a second wireless device; and a decision on whether or how to configure power boosting for a second wireless device.

11. The method of claim 1, wherein said obtaining comprises inferring or deducing at least some of the radio performance information, wherein inferring or deducing at least some of the radio performance information comprises inferring or deducing radio performance information that indicates radio performance of a cell, based on:

a change in an extent to which the cell transmits or receives user plane traffic to a second wireless device; and/or a change in an allocation of resources for transmitting or receiving user plane traffic to a second wireless device in the cell.

12. The method of claim 1, wherein the network node is:

a radio network node configured as a master radio network node for multi-connectivity operation of at least one of the one or more wireless devices;

a secondary radio network node for multi-connectivity operation of at least one of the one or more wireless devices; or an operation and maintenance node.

13. The method of claim 1, wherein said configuring another network node to make decisions on mobility, scheduling, and/or radio configuration of wireless devices based on the prediction model comprises transmitting the prediction model to said another network node.

14. The method of claim 1, wherein the prediction model is a machine learning model built using machine learning.

15. The method of claim 1, wherein making, or configuring another network node to make, decisions on mobility, scheduling, and/or radio configuration of wireless devices based on the prediction model comprises making, or configuring another network node to make, decisions on mobility, scheduling, and/or radio configuration of wireless devices based on comparing radio performances that different cells will provide under the same one or more conditions according to the prediction model, wherein the radio performances that the different cells will provide under the same one or more conditions are modeled based on radio performances that the different cells respectively provided in multi-connectivity operation.

16. The method of claim 1, wherein:

said obtaining comprises inferring or deducing at least some of the radio performance information, wherein inferring or deducing at least some of the radio performance information comprises inferring or deducing radio performance information that indicates radio performance of a cell, based on whether the cell has transmitted or received user plane traffic to a second wireless device within a certain time interval; and/or the method comprises making, or configuring another network node to make, decisions on radio configuration of wireless devices based on the prediction model, wherein said decision on radio configuration comprises a decision on whether or how to configure transmission time interval (TTI) bundling for a second wireless device.

17. The method of claim 1, wherein the radio performances that the different cells will provide under the same one or more conditions are modeled based on parallel measurements of radio performances that the different cells respectively provided to a wireless device while simultaneously serving that wireless device in multi-connectivity operation, the multi-connectivity operation enabling the parallel measurements to be obtained under the same one or more conditions such that the radio performances are comparable.

18. A network node configured to:

obtain, for each of one or more wireless devices, radio performance information indicating measured radio performances that multiple cells respectively provided to the wireless device while the wireless device was simultaneously connected to the multiple cells in multi-connectivity operation under certain conditions;

based on the obtained radio performance information, build a prediction model which models radio performance that a cell will provide under one or more conditions, wherein the prediction model models radio performance that a cell will provide in terms of one or more performance metrics predicted for the cell under the one or more conditions, wherein the one or more performance metrics include one or more absolute or relative measures of data throughput, radio link control throughput, signal strength, signal quality, spectral efficiency, packet error rate, packet delay, packet loss rate, channel quality information, and/or block error rate for the cell; and make, or configure another network node to make, decisions on mobility, scheduling, and/or radio configuration of wireless devices based on comparing radio performances that different cells will provide under the same one or more conditions according to the prediction model, wherein the radio performances that the different cells will provide under the same one or more conditions are modeled based on radio performances that the different cells respectively provided in multi-connectivity operation.

19. The network node of claim 18, wherein the one or more wireless devices are one or more first wireless devices, wherein:

for each of the one or more first wireless devices, the radio performance information obtained for the first wireless device indicates measured radio performances that the multiple cells respectively provided to the first wireless device while the first wireless device was simultaneously connected to the multiple cells in the multi-connectivity operation during certain times and/or at certain locations, wherein the prediction model models radio performance that a cell will provide during one or more times and/or at one or more locations, and wherein the processing circuitry is configured to make, or configure another network node to make, decisions on mobility, scheduling, and/or radio configuration of a second wireless device based on comparing radio performances that different cells will provide during a given time and/or at a given location as predicted according to the prediction model; and/or for each of the one or more first wireless devices, the radio performance information obtained for the first wireless device indicates measured radio performances that the multiple cells respectively provided to the first wireless device while the first wireless device was simultaneously connected to the multiple cells in the multi-connectivity operation under a certain cell load level, wherein the prediction model models radio performance that a cell will provide under one or more cell load levels, and wherein the processing circuitry is configured to make, or configure another network node to make, decisions on mobility, scheduling, and/or radio configuration of a second wireless device based on comparing radio performances that different cells will provide under a given cell load level as predicted according to the prediction model; and/or for each of the one or more first wireless devices, the radio performance information obtained for the first wireless device indicates measured radio performances that the multiple cells respectively provided to the first wireless device while the first wireless device was simultaneously connected to the multiple cells in the multi-connectivity operation using a certain radio configuration, wherein the prediction model models radio performance that a cell will provide under one or more radio configurations, and wherein the processing circuitry is configured to make, or configure another network node to make, decisions on mobility, scheduling, and/or radio configuration of a second wireless device based on comparing radio performances that different cells will provide using a given radio configuration as predicted according to the prediction model; and/or for each of the one or more first wireless devices, the radio performance information obtained for the first wireless device indicates measured radio performances that the multiple cells respectively provided to the first wireless device while the first wireless device was simultaneously connected to the multiple cells in the multi-connectivity operation with certain device capabilities, wherein the prediction model models radio performance that a cell will provide to any wireless device with one or more device capabilities, and wherein the processing circuitry is configured to make, or configure another network node to make, decisions on mobility, scheduling, and/or radio configuration of a second wireless device based on comparing radio performances that different cells will provide to the second wireless device with one or more given device capabilities as predicted according to the prediction model.

20. The network node of claim 18, comprising making, or configuring another network node to make, decisions on mobility of wireless devices based on the prediction model, wherein said decisions on mobility include at least one of any one or more of:

a decision on which cell is to be a target of a mobility procedure for a second wireless device;

a decision on which wireless device is to perform a mobility procedure; and a decision on where or when a second wireless device is to perform a mobility procedure.

21. The network node of claim 18, wherein the processing circuitry is configured to make, or configure another network node to make, decisions on scheduling of wireless devices based on the prediction model, by making, or configuring another network node to make, a decision that a second wireless device is to be prioritized for scheduling before the second wireless device arrives at a location where, according to the prediction model, one or more cells will provide radio performance below a threshold.

22. The network node of claim 18, wherein the processing circuitry is configured to make, or configure another network node to make, decisions on radio configuration of wireless devices based on the prediction model, wherein a decision on radio configuration comprise at least one of any one or more of:

a decision on whether or how to configure multi-connectivity operation of a second wireless device;

a decision on whether or how to configure carrier aggregation for a second wireless device; and a decision on whether or how to configure power boosting for a second wireless device.

23. The network node of claim 18, wherein the processing circuitry is configured to obtain the radio performance information by comprises inferring or deducing at least some of the radio performance information, wherein inferring or deducing at least some of the radio performance information comprises inferring or deducing radio performance information that indicates radio performance of a cell, based on:

a change in an extent to which the cell transmits or receives user plane traffic to a second wireless device; and/or a change in an allocation of resources for transmitting or receiving user plane traffic to a second wireless device in the cell.

24. The network node of claim 18, wherein the processing circuitry is configured to make, or configure another network node to make, decisions on mobility, scheduling, and/or radio configuration of wireless devices based on the prediction model by making, or configuring another network node to make, decisions on mobility of a given wireless device based on comparing radio performances that different cells will provide to the given wireless device under the same one or more conditions according to the prediction model, wherein the radio performances that the different cells will provide under the same one or more conditions are modeled by the prediction model based on radio performances that the different cells respectively provided in multi-connectivity operation.

25. The network node of claim 18, wherein:

the processing circuitry is configured to obtain the radio performance information by comprises inferring or deducing at least some of the radio performance information, wherein inferring or deducing at least some of the radio performance information comprises inferring or deducing radio performance information that indicates radio performance of a cell, based on whether the cell has transmitted or received user plane traffic to a second wireless device within a certain time interval; and/or the processing circuitry is configured to make, or configure another network node to make, decisions on radio configuration of wireless devices based on the prediction model, wherein a decision on radio configuration comprises a decision on whether or how to configure transmission time interval (TTI) bundling for a second wireless device.

* * * * *